United States Patent
Katoh et al.

(10) Patent No.: US 9,245,005 B2
(45) Date of Patent: Jan. 26, 2016

(54) COMPUTER-READABLE RECORDING MEDIUM, EXTRACTION DEVICE, AND EXTRACTION METHOD

(71) Applicant: FUJITSU LIMITED, Kawasaki-shi, Kanagawa (JP)

(72) Inventors: Takashi Katoh, Yokohama (JP); Shinichiro Tago, Shinagawa (JP); Tatsuya Asai, Kawasaki (JP); Hiroaki Morikawa, Kawasaki (JP); Hiroya Inakoshi, Tama (JP); Nobuhiro Yugami, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 14/032,381

(22) Filed: Sep. 20, 2013

(65) Prior Publication Data
US 2014/0156692 A1    Jun. 5, 2014

(30) Foreign Application Priority Data

Nov. 30, 2012  (JP) .................................. 2012-263467

(51) Int. Cl.
*G06F 17/00* (2006.01)
*G06N 5/02* (2006.01)
*G06F 17/30* (2006.01)

(52) U.S. Cl.
CPC ................................ *G06F 17/30654* (2013.01)

(58) Field of Classification Search
None
See application file for complete search history.

(56) References Cited

U.S. PATENT DOCUMENTS

| 8,041,721 | B2 * | 10/2011 | Tago ................. | G06F 17/30887 707/749 |
| 8,122,025 | B2 * | 2/2012 | Ando ................... | G06Q 10/107 707/628 |
| 8,176,050 | B2 * | 5/2012 | Inakoshi ........... | G06F 17/30943 707/737 |
| 8,190,632 | B2 * | 5/2012 | Tago ................. | G06F 17/30961 707/770 |
| 8,655,921 | B2 * | 2/2014 | Tago ................. | G06F 17/30938 707/802 |

(Continued)

FOREIGN PATENT DOCUMENTS

| JP | 04-125734 | 4/1992 |
| JP | 08-6957 | 1/1996 |

(Continued)

OTHER PUBLICATIONS

Horizontal Aggregations in SQL to Prepare Data Sets for Data Mining Analysis, Ordonez, C.; Zhibo Chen Knowledge and Data Engineering, IEEE Transactions on Year: 2012, vol. 24, Issue: 4 pp. 678-691, DOI: 10.1109/TKDE.2011.16 Referenced in: IEEE Journals & Magazines.*

(Continued)

*Primary Examiner* — Michael B Holmes
(74) *Attorney, Agent, or Firm* — Fujitsu Patent Center

(57) ABSTRACT

An extraction program causes a computer to execute a process. The process includes adding an event to a first pattern including the events according to the sequential order, thus generating a second pattern in such a manner that the second pattern is generated by adding the event when a first value is less than a predetermined threshold; when the event is added, adding a predetermined value to the first value, and adding the predetermined value to a second value in a column corresponding to an end of the added event among second values corresponding to respective columns of a table; extracting the second pattern that satisfies a predetermined condition; and when an event in a second or subsequent column in the table is added.

7 Claims, 23 Drawing Sheets

(56) References Cited

U.S. PATENT DOCUMENTS

| | | | |
|---|---|---|---|
| 8,732,117 B2* | 5/2014 | Maruhashi | G06F 17/30539 707/602 |
| 2005/0257006 A1 | 11/2005 | Yoshida et al. | |
| 2009/0009807 A1 | 1/2009 | Sugi | |
| 2009/0216751 A1* | 8/2009 | Tago | G06F 17/30887 |
| 2011/0182479 A1 | 7/2011 | Sese et al. | |
| 2013/0066827 A1* | 3/2013 | Maruhashi | G06F 17/30539 707/602 |
| 2013/0325761 A1* | 12/2013 | Morikawa | G06N 99/005 706/12 |
| 2014/0114900 A1* | 4/2014 | Katoh | G06N 5/04 706/48 |
| 2014/0136149 A1* | 5/2014 | Katoh | G06Q 10/10 702/189 |
| 2014/0156692 A1* | 6/2014 | Katoh | G06F 17/30654 707/758 |

FOREIGN PATENT DOCUMENTS

| | | |
|---|---|---|
| JP | 2001-522095 | 11/2001 |
| JP | 200917340 A | 1/2009 |
| WO | 9923577 | 5/1999 |
| WO | 2004010232 A1 | 1/2004 |
| WO | 2010041678 A1 | 4/2010 |

OTHER PUBLICATIONS

Scalable Parallel Join for Huge Tables Nianlong Weng; Minqi Zhou; Ming-Chien Shan; Aoying Zhou Big Data (BigData Congress), 2013 IEEE International Congress on Year: 2013 pp. 157-164, DOI: 10.1109/BigData.Congress.2013.29 Referenced in: IEEE Conference Publications.*

Efficient Star Join for Column-oriented Data Store in the MapReduce Environment Haitong Zhu; Minqi Zhou; Fan Xia; Aoying Zhou Web Information Systems and Applications Conference (WISA), 2011 Eighth Year: 2011 pp. 13-18, DOI: 10.1109/WISA.2011.10 Referenced in: IEEE Conference Publications.*

Combining Tag and Value Similarity for Data Extraction and Alignment Weifeng Su; Jiying Wang; Lochovsky, F.H.; Yi Liu Knowledge and Data Engineering, IEEE Transactions on Year: 2012, vol. 24, Issue: 7 pp. 1186-1200, DOI: 10.1109/TKDE.2011.66 Referenced in: IEEE Journals & Magazines.*

US Office Action dated Jul. 13, 2015 for U.S. Appl. No. 14/037,446, 23 pages.

US Non-Final Office Action issued on Sep. 17, 2015 in co-pending U.S. Appl. No. 14/037,446, 21 pages.

* cited by examiner

COMPUTER-READABLE RECORDING MEDIUM, EXTRACTION DEVICE, AND EXTRACTION METHOD

CROSS-REFERENCE TO RELATED APPLICATION

This application is based upon and claims the benefit of priority of the prior Japanese Patent Application No. 2012-263467, filed on Nov. 30, 2012, the entire contents of which are incorporated herein by reference.

FIELD

The embodiments discussed herein are related to a computer-readable recording medium, an extraction device, and an extraction method.

BACKGROUND

There is an extraction device that extracts patterns included in patterns of events represented by event data that have actually occurred. As an example of the event data, there is exemplified event data that represents patterns of events indicating information and answers of a respondent who has replied to one questionnaire. A description will now be made of a case in which the event data includes an event A that "the respondent to the questionnaire is male", an event B that "the respondent to the questionnaire is aged in the thirties", and an event C that "the answer to Question 1 of the questionnaire is 'A1'". In this case, the extraction device extracts the following patterns. The extraction device extracts, for example, a pattern of the event A, a pattern of the events A and B, a pattern of the events A, B, and C, a pattern of the event B, a pattern of the events B and C, and a pattern of the event C. Extracting these patterns with the extraction device allows a user of the extraction device to understand that the respondent who is male and aged in his thirties has given the reply "A1" to Question 1.

The following extraction device is an example of the extraction device described above. For example, an extraction device generates a child from a parent in an enumeration tree and determines whether the generated child occurs in patterns of events represented by event data that have actually occurred, and thus extracts a pattern included in the patterns of events represented by the event data that have actually occurred. Such an extraction device generates a child pattern by adding events to a parent pattern. The extraction device then uses the newly generated child pattern as a parent pattern to generate again a child pattern. In this manner, the extraction device repeats generation of a child pattern until a predetermined condition is satisfied. Conventional examples are described in Japanese National Publication of International Patent Application No. 2001-522095, Japanese Laid-open Patent Publication No. 04-125734, and Japanese Laid-open Patent Publication No. 08-6957.

However, the above-described extraction device has a problem in that it fails to extract patterns efficiently. Specifically, such an extraction device generates a pattern that does not exist as an extracted pattern. A description will be made of a case in which, for example, the following event is added to the parent pattern in addition to the above-described events A, B, and C. Specifically, a description will be made of a case in which there are an event D that "the respondent to the questionnaire is female", an event E that "the respondent to the questionnaire is aged in the twenties", and an event F that "the answer to Question 1 of the questionnaire is 'A2'". In this case, the events A and D do not occur together in a pattern of events represented by the event data that represents the pattern of events indicating information and answers of a respondent who has replied to one questionnaire. That is because the sex of the respondent is either male or female. In addition, the events B and E do not occur together in such a pattern of events. That is because it is impossible to belong to both generations of the twenties and the thirties. Moreover, when Question 1 of the questionnaire is to be replied in the form of giving one answer, the events C and F do not occur together in such a pattern of events.

However, when a parent pattern includes the event A, the above-described extraction device generates a child pattern including the events A and D by adding the event D to the parent pattern. In the same way, when a parent pattern includes the event B, the above-described extraction device generates a child pattern including the events B and E by adding the event E to the parent pattern. When a parent pattern includes the event C, the above-described extraction device generates a child pattern including the events C and F by adding the event F to the parent pattern. In other words, the above-described extraction device generates patterns that include combinations of events that do not occur in events represented by event data, that is, mutually exclusive events. Although the patterns include the combinations of events that do not occur in the events represented by the event data, the above-described extraction device performs unnecessary processing of determining whether such patterns occur in the patterns of the events represented by the event data. This poses a problem in that the above-described extraction device fails to extract patterns efficiently.

SUMMARY

According to an aspect of an embodiment, a non-transitory computer-readable recording medium having stored therein an extraction program that causes a computer to execute a process. The process includes, with reference to a table that is stored in a storage unit and that includes events of which mutually exclusive events are arranged in the same column, adjacent events of the same type are joined together, and the events are given sequences in the order of occurrence thereof, adding an event to a first pattern including the events according to the sequential order, thus generating a second pattern in such a manner that the second pattern is generated by adding the event when a first value is less than a predetermined threshold; when the event is added, adding a predetermined value to the first value, and adding the predetermined value to a second value in a column corresponding to an end of the added event among second values corresponding to respective columns of the table; extracting the second pattern that satisfies a predetermined condition; and when an event in a second or subsequent column in the table is added, subtracting the second value in a column immediately before the end of the added event from the first value, thus updating the first value that is to be compared with the predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Preferred embodiments of the present invention will be explained with reference to accompanying drawings.

It is to be noted that the embodiments do not limit the technique disclosed herein.

First Embodiment

Configuration of Extraction Device

Figure 1:
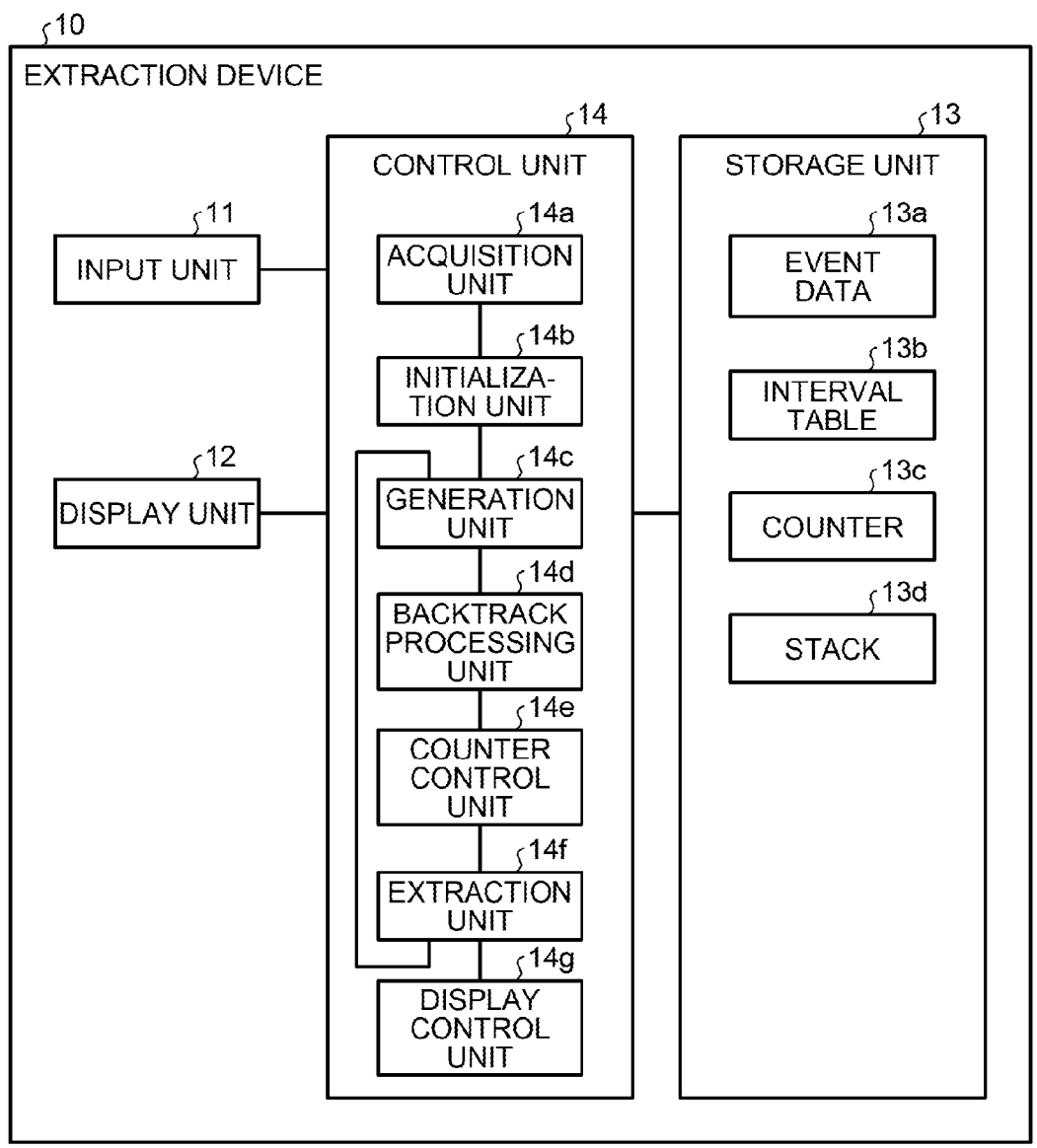
FIG. 1 is a diagram illustrating an example of a functional configuration of an extraction device according to a first embodiment of the present invention.

A description will be made of an extraction device according to a first embodiment of the present invention. FIG. 1 is a diagram illustrating an example of a functional configuration of the extraction device according to the first embodiment. As illustrated in FIG. 1, this extraction device 10 includes an input unit 11, a display unit 12, a storage unit 13, and a control unit 14.

The input unit 11 enters information into the control unit 14. For example, the input unit 11 accepts an instruction from a user, and enters, into the control unit 14, an instruction to execute an extraction process to be described later. The input unit 11 also accepts an instruction from the user, and enters, into the control unit 14, an instruction to acquire event data 13a to be described later from a predetermined server. The input unit 11 accepts an operation from the user, and supplies an interval table 13b to be described later into the control unit 14. A keyboard and a mouse are examples of devices of the input unit 11.

The display unit 12 displays thereon various types of information. For example, the display unit 12 displays thereon a pattern extracted by an extraction unit 14f to be described later under the control of a display control unit 14g to be described later.

The storage unit 13 stores therein various programs executed by the control unit 14. An acquisition unit 14a to be described later stores the event data 13a and the interval table 13b into the storage unit 13. The storage unit 13 also stores therein a counter 13c. The storage unit 13 includes a memory area of a stack 13d.

The event data 13a will now be described. The event data 13a is data in which an event that has actually occurred is associated with the time at which the event occurred. A description will be made below of a case in which the event data 13a includes a plurality of pieces of data each of which represents a pattern of events indicating information and answers of a respondent who has replied to one questionnaire. Accordingly, a pattern of a combination of mutually exclusive events does not occur in the event data representing a pattern of events indicating information and answers of a respondent who has replied to one questionnaire, but can occur in the event data 13a. The event data 13a can employ data that includes various events, not limited to these events.

Examples of the patterns of events represented by the event data 13a include an event indicated by an identifier A, an event indicated by an identifier B, an event indicated by an identifier C, an event indicated by an identifier D, an event indicated by an identifier E, an event indicated by an identifier F, and an event indicated by an identifier G. In the following description, the event indicated by the identifier A is expressed as an "event A". In the same way, the event indicated by the identifier B is expressed as an "event B"; the event indicated by the identifier C is expressed as an "event C"; the event indicated by the identifier D is expressed as an "event D"; and the event indicated by the identifier E is expressed as an "event E". Also, the event indicated by the identifier F is expressed as an "event F", and the event indicated by the identifier G is expressed as an "event G".

The present embodiment assumes the events A, C, and F as a combination of mutually exclusive events. The present embodiment also assumes the events A, D, and F as a combination of mutually exclusive events. The present embodiment also assumes the events A, D, and G as a combination of mutually exclusive events. The present embodiment also assumes the events B, D, and G as a combination of mutually exclusive events. The present embodiment further assumes the events B, E, and G as a combination of mutually exclusive events. For example, the events A, C, and F are the combination of mutually exclusive events, and thus, both of the events A and C do not occur together in any pattern of events indicating information and answers of a respondent who has replied to one questionnaire. In addition, both of the events A and F do not occur together, and both of the events C and F do not occur together, in any pattern of events indicating information and answers of a respondent who has replied to one questionnaire. The same applies also to the other combinations of mutually exclusive events.

The interval table 13b will now be described. The interval table 13b registers therein combinations of the event identifiers representing the combinations of events that do not occur in any pattern of events indicating information and answers of a respondent who has replied to one questionnaire, in other words, representing the combinations of mutually exclusive events. The interval table 13b also defines the order of events that is used when the events are added to an episode to generate a new episode. The interval table 13b is generated by the user.

Figure 2:
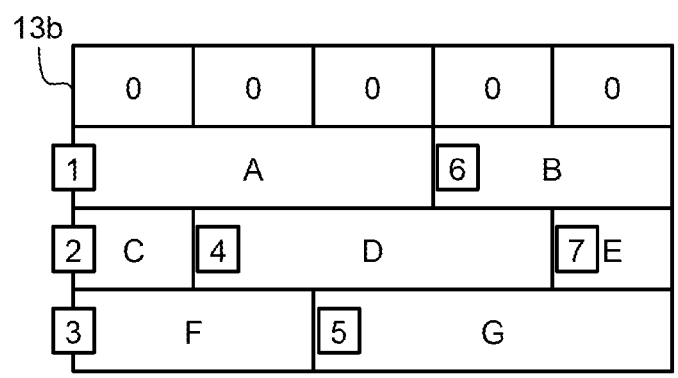
FIG. 2 is a diagram illustrating an example of an interval table.

FIG. 2 is a diagram illustrating an example of the interval table. The interval table 13b illustrated in the example of FIG. 2 illustrates a case in which the table registers therein, in the column direction, the combinations of events that do not occur in patterns of events each indicating information and answers of a respondent who has replied to one questionnaire. The interval table 13b in the example of FIG. 2 illustrates a case in which the combination of the events A, C, and F is registered in the column direction. The interval table 13b in the example of FIG. 2 also illustrates a case in which the combination of the events A, D, and F is registered in the column direction. The interval table 13b in the example of FIG. 2 illustrates a case in which the combination of the events A, D, and G is registered in the column direction. The interval table 13b in the example of FIG. 2 illustrates a case in which the combination of the events B, D, and G is registered in the column direction. The interval table 13b in the example of FIG. 2 further illustrates a case in which the combination of the events B, E, and G is registered in the column direction.

Specifically, the interval table 13b illustrates that the combination of the events A and C does not occur in any pattern of events indicating information and answers of a respondent who has replied to one questionnaire. The interval table 13b illustrates that the combination of the events A and F does not occur in any pattern of events indicating information and answers of a respondent who has replied to one questionnaire. The interval table 13b illustrates that the combination of the events C and F does not occur in any pattern of events indicating information and answers of a respondent who has replied to one questionnaire. The interval table 13b illustrates that a combination of the events A and D does not occur in any pattern of events indicating information and answers of a respondent who has replied to one questionnaire. The interval table 13b illustrates that a combination of the events D and F does not occur in any pattern of events indicating information and answers of a respondent who has replied to one questionnaire. The interval table 13b illustrates that a combination of the events A and G does not occur in any pattern of events indicating information and answers of a respondent who has replied to one questionnaire. The interval table 13b illustrates that a combination of the events D and G does not occur in any pattern of events indicating information and answers of a respondent who has replied to one questionnaire. The interval table 13b illustrates that a combination of the events B and G does not occur in any pattern of events indicating information and answers of a respondent who has replied to one questionnaire. The interval table 13b illustrates that a combination of the events B and D does not occur in any pattern of events indicating information and answers of a respondent who has replied to one questionnaire. The interval table 13b illustrates that a combination of the events B and E does not occur in any pattern of events indicating information and answers of a respondent who has replied to one questionnaire. The interval table 13b illustrates that a combination of the events E and G does not occur in any pattern of events indicating information and answers of a respondent who has replied to one questionnaire.

The interval table 13b illustrated in the example of FIG. 2 illustrates a case in which the event identifiers included in one combination of mutually exclusive events are registered in the form of 3 rows×1 column, and five such combinations of mutually exclusive events are registered. In the interval table 13b illustrated in the example of FIG. 2, the first row is the top row; the third row is the bottom row; the first column is the leftmost column; and the fifth column is the rightmost column.

Although the example of FIG. 2 illustrates a case in which the identifier A of the event A is registered from the first column to the third column in the first row of the interval table 13b, the identifier A is actually registered as follows. That is, the identifier A of the event A is actually registered in each position where each of the first to the third columns intersects the first row in the interval table 13b.

Although the example of FIG. 2 illustrates a case in which the identifier F of the event F is registered in the first column and the second column in the third row of the interval table 13b, the identifier F is actually registered as follows. That is, the identifier F of the event F is actually registered in each position where each of the first and the second columns intersects the third row in the interval table 13b.

Although the example of FIG. 2 illustrates a case in which the identifier D of the event D is registered from the second column to the fourth column in the second row of the interval table 13b, the identifier D is actually registered as follows. That is, the identifier D of the event D is actually registered in each position where each of the second to the fourth columns intersects the second row in the interval table 13b.

Although the example of FIG. 2 illustrates a case in which the identifier G of the event G is registered from the third column to the fifth column in the third row of the interval table 13b, the identifier G is actually registered as follows. That is, the identifier G of the event G is actually registered in each position where each of the third to the fifth columns intersects the third row in the interval table 13b.

Although the example of FIG. 2 illustrates a case in which the identifier B of the event B is registered in the fourth column and the fifth column in the first row of the interval table 13b, the identifier B is actually registered as follows. That is, the identifier B of the event B is actually registered in each position where each of the fourth and the fifth columns intersects the first row in the interval table 13b.

The interval table 13b also defines the order of events that is used when the events are added to an episode to generate a new episode. An example of the order in which events are added will be described. For example, an event indicated by an identifier registered in the position where the first row intersects the first column (starting point position) in the interval table 13b serves as an event to be added first. Then, events are added in the order from an event indicated by an identifier registered in the position nearest in the row direction to the starting point position of the interval table 13b. If identifiers are registered in the same position in the row direction relative to the starting point position, events are added in the order from an event indicated by an identifier registered in the position nearest in the column direction to the starting point position. For example, the interval table 13b illustrated in the example of FIG. 2 illustrates that the event to be added first is the event A; the event to be added second the event C; the event to be added third is the event F; and the event to be added fourth is the event D. The interval table 13b illustrated in the example of FIG. 2 also illustrates that the event to be added fifth is the event G; the event to be added sixth is the event B; and the event to be added seventh is the event E.

The interval table 13b is provided with a point management variable for each combination of mutually exclusive events, that is, for each column.

The counter 13c registers therein a count value (value) included in the combination of mutually exclusive events registered in the interval table 13b, where the count value is the number of events in a pattern to which the events are added.

Each time the value of the counter 13c is updated, the value before the update is registered into the memory area of the stack 13d. When a value is taken out of the memory area of the stack 13d, the last registered value is taken out. In other words, the data registered in the memory area is taken out using a last-in-first-out (LIFO) method. This means that the stack 13d is a virtual stack represented by the memory area of the stack 13d.

The storage unit 13 is a storage device, such as a semiconductor memory device including a flash memory, a hard disk, or an optical disc. The storage unit 13 is not limited to the above-described types of storage devices, but may be a random access memory (RAM) or a read-only memory (ROM).

The control unit 14 includes an internal memory for storing therein programs defining various processing procedures and control data, and performs various processes using these programs and the control data. As illustrated in FIG. 1, the control unit 14 includes the acquisition unit 14a, an initialization unit 14b, a generation unit 14c, a backtrack processing unit 14d, a counter control unit 14e, the extraction unit 14f, and the display control unit 14g.

The acquisition unit 14a acquires various types of information. For example, when an instruction to acquire the event data 13a from the predetermined server is entered from the input unit 11, the acquisition unit 14a performs the following process based on the instruction. That is, the acquisition unit 14a accesses the predetermined server (not illustrated) via a network (not illustrated) to acquire the event data 13a from the predetermined server. Then, the acquisition unit 14a stores the acquired event data 13a into the storage unit 13. When the interval table 13b is supplied from the input unit 11, the acquisition unit 14a acquires the supplied interval table 13b, and stores the acquired interval table 13b into the storage unit 13.

When the instruction to execute the extraction process is entered from the input unit 11, the acquisition unit 14a acquires the event data 13a and the interval table 13b from the storage unit 13.

Figure 3:
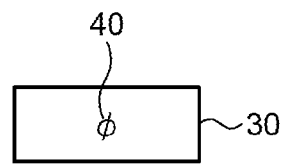
FIG. 3 is a diagram for explaining an example of a process executed by the extraction device according to the first embodiment.

The initialization unit 14b performs various types of initialization. For example, when the acquisition unit 14a has acquired the event data 13a and the interval table 13b, the initialization unit 14b sets an episode that is empty (empty episode) as the first parent, that is, the root in the enumeration tree. Here, the episode is expressed in a form of a directed graph representing an order (occurrence order) in which events occur. For example, the episode includes a plurality of parts. Each of the parts includes events. Each of the parts is given an order. A description will now be made of a relation between events included in an N-th part and events included in an (N+1)-th part included in the episode. In the relation between the events included in the N-th part and the events included in the (N+1)-th part, the events included in the (N+1)-th part occur after all of the events included in the N-th part occur. FIG. 3 is a diagram for explaining an example of a process executed by the extraction device according to the first embodiment. As illustrated in the example of FIG. 3, the initialization unit 14b sets an empty episode 40 as a root episode 30.

Next, when an event is added to the episode to generate a new episode, the initialization unit 14b sets a null value for an addition candidate that is a candidate event to be added, thus initializing the addition candidate.

Figure 4:
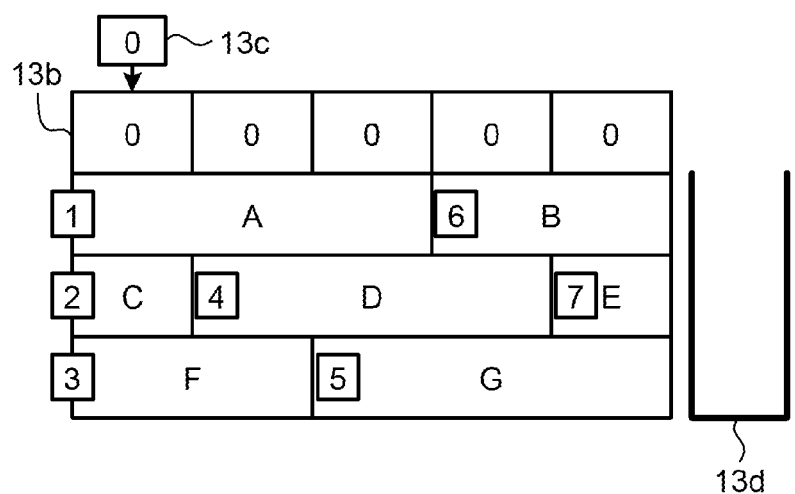
FIG. 4 is a diagram for explaining an example of a process executed by the extraction device according to the first embodiment.

Then, the initialization unit 14b sets the values of the point management variables in all columns of the interval table 13b to "0", thus initializing the point management variables. FIG. 4 is a diagram for explaining an example of a process executed by the extraction device according to the first embodiment. For example, as illustrated in the example of FIG. 4, the initialization unit 14b sets the values of the point management variables in all of the columns of the interval table 13b to "0".

Next, the initialization unit 14b sets the first column as a column to be processed. For example, the initialization unit 14b sets the column to be processed at the first column (column in which the combination of the events A, C, and F is registered) of the interval table 13b illustrated in the example of FIG. 4. As the column to be processed, a column is set in which a combination of events including the event set as the addition candidate is registered. To make a detailed description, in the interval table 13b, as the column to be processed, the leftmost column of a row is set in which the identifier of the event set as the addition candidate is registered. Therefore, in the present embodiment, the column set as the column to be processed changes as the event set as the addition candidate changes. For example, when the event F of the interval table 13b illustrated in the example of FIG. 4 is set as the addition candidate, and thereafter the event D is newly set as the addition candidate, the column set as the column to be processed is changed from the first column to the second column. When the null value is set for the addition candidate, the first column is set as the column to be processed. In the example of FIG. 4, the counter 13c is set in a position corresponding to the first column. This example schematically represents that the column to be processed is set at the first column. In the same way, in each drawing used in the description below, the counter 13c may be set in a position corresponding to the N-th column of the interval table 13b. Such a drawing schematically represents that the column to be processed is set at the N-th column.

The initialization unit 14b then initializes the counter 13c by setting the value of the counter 13c to "0". Next, the initialization unit 14b sets a threshold, to a value described below, that is used in a process performed by the generation unit 14c to be described later to determine whether the value of the counter 13c is less than the threshold. That is, the initialization unit 14b sets the threshold to a value of a window width that is used when the episode is extracted and that is a temporal width used in searching for an event pattern of the event data 13a. The window width is, for example, "2" in the case of attempting to extract event patterns that have occurred during time (2 to 3) from time "2" to time "3". Although a case will be described below in which the window width is "2", the window width is not limited to this.

The generation unit 14c generates various patterns. An embodiment of the generation unit 14c will be described. The generation unit 14c first selects the root episode 30.

Then, the generation unit 14c determines whether there are a candidate event to be added to the selected episode and a candidate part to which the event is to be added. In the present embodiment, a case will be described in which the empty episode 30 includes a first part and a second part. The empty episode 30 includes the two parts, and therefore, a descendant episode of the empty episode 30 also includes the two parts. In this case, according to the order of events to be added indicated by the interval table 13b, the generation unit 14c identifies one candidate event to be added to the selected episode. Then, when the identified candidate event is not selected in a combination with either of the parts of the selected episode, the generation unit 14c determines that there are a candidate event to be added to the selected episode and a candidate part to which the event is to be added. Note that the present embodiment assumes that the same events are not included in the same part. When, instead, there is no unselected candidate event in either of the combinations with the parts of the selected episode, the generation unit 14c determines that there is no candidate event to be added to the selected episode. For example, when the root episode 30 illustrated in FIG. 3 is selected, the event A serving as the event to be added first is not selected in any combination with either of the parts of the episode 30. This causes the generation unit 14c to determine that there are the event A to be added to a part of the selected episode 30 and a part (either of the first part and the second part) to which the event A is to be added. In the case in which display of the display unit 12 is controlled so as to display the episode by the display control unit 14g, the generation unit 14c determines, in the same way, whether there are a candidate event to be added to the selected episode and a candidate part to which the event is to be added. Also, in the case in which the counter control unit 14e has decremented the value of the point management variable by one, the generation unit 14c determines, in the same way, whether there are a candidate event to be added to the selected episode and a part to which the event is to be added.

When there are a candidate event to be added to the selected episode and a part to which the event is to be added, the generation unit 14c selects one candidate event and one candidate part. For example, in the example of FIG. 3, when the event A to be added to the selected episode 30 and either of the first part and the second part to which the event is to be added exist, the generation unit 14c selects the event A as the candidate event. In addition, the generation unit 14c selects, as the candidate part, the first part that has a smaller order number between the first and the second parts to which the event can be added. In the following description, the candidate event may be expressed as a "candidate event e".

Next, the generation unit 14c determines whether, in the interval table 13b, the column to be processed is the leftmost column of a row in which the identifier of the selected candidate event e is registered. For example, in the case illustrated in FIG. 4, a case will be described in which the column to be processed is the first column, and the selected candidate event e is the event A. In this case, the leftmost column of the row in which the identifier A of the selected candidate event e is registered is in the first row. Therefore, in that case, the generation unit 14c determines that, in the interval table 13b, the column to be processed is the leftmost column of the row in which the identifier A of the selected candidate event e is registered. It is to be noted that, when the counter control unit 14e has moved the position of the column to be processed to the column on the immediate right, the generation unit 14c also determines whether the column to be processed is the leftmost column of the row in which the identifier of the selected candidate event e is registered.

When the column to be processed is the leftmost column of the row in which the identifier of the selected candidate event e is registered, the generation unit 14c sets the selected candidate event as the addition candidate. Then, the generation unit 14c determines whether, in the interval table 13b, the value of the counter 13c is less than the threshold "2". For example, in the case illustrated in the example of FIG. 4, the value of the counter 13c is "0". Therefore, the generation unit 14c determines that the value "0" of the counter 13c is less than the threshold "2".

When the value of the counter 13c is not less than the threshold "2", the generation unit 14c performs the above-described process to determine whether there are a candidate event to be added to the selected episode and a candidate part to which the event is to be added, and performs again the processes following that process.

Figure 5:
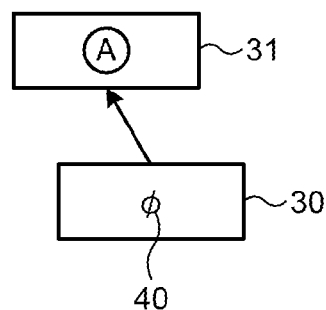
FIG. 5 is a diagram for explaining an example of a process executed by the extraction device according to the first embodiment.

When, instead, the value of the counter 13c is less than the threshold "2", the generation unit 14c generates an episode by adding the selected candidate event to the selected candidate part of the selected episode. The generation unit 14c then selects the generated episode. FIG. 5 is a diagram for explaining an example of a process executed by the extraction device according to the first embodiment. For example, as illustrated in the example of FIG. 5, the generation unit 14c generates an episode 31 by adding the event A that is the selected candidate event to the selected candidate part of the selected episode 30. The generation unit 14c then selects the generated episode 31.

In this manner, in the present embodiment, when the counter 13c has a value less than the threshold "2", an episode is generated by adding a selected candidate event e to a selected candidate part of a selected episode. In the present embodiment, no new episode is generated when the counter 13c has a value not less than the threshold "2". This comes from the following reason. That is, as described above, the event data 13a includes a plurality of pieces of data each representing a pattern of events indicated by data including information and answers of a respondent who has replied to a questionnaire. As a result, a combination of mutually exclusive events also occurs in the pattern of events represented by the event data 13a, although the combination of mutually exclusive events does not occur in any pattern of events indicating information and answers of a respondent who has replied to one questionnaire. The present embodiment does not generate a pattern that includes a number (larger than the size of the window width) of combinations of events that do not occur in the pattern of events indicated by data including information and answers of a respondent who has replied to one questionnaire. This keeps the present embodiment from performing unnecessary processes, such as a process to calculate the frequency of patterns including the combinations of mutually exclusive events and a process to determine whether such patterns occur frequently. This, in turn, allows the present embodiment to efficiently extract the patterns. The process may be called "pruning" in which no episode is generated when the counter 13c has a value not less than the threshold "2".

If, as a result of the determination of whether there are a candidate event to be added to the selected episode and a candidate part to which the event is to be added, there is no candidate event to be added or no candidate part to which the event is to be added, the generation unit 14c performs the following process. That is, the generation unit 14c determines whether all the episodes are generated except episodes that are no longer generated because of the pruning. If all the episodes are generated except episodes that are no longer generated because of the pruning, the process is terminated.

The backtrack processing unit 14d performs backtracking. For example, when the extraction unit 14f determines that an episode generated by the generation unit 14c does not occur frequently, the backtrack processing unit 14d deletes the last added event from the episode to generate an episode. Then, the backtrack processing unit 14d selects the generated episode.

When the generation unit 14c does not determine that all the episodes are generated except episodes that are no longer generated because of the pruning, the backtrack processing unit 14d also performs the same processing.

Figure 6:
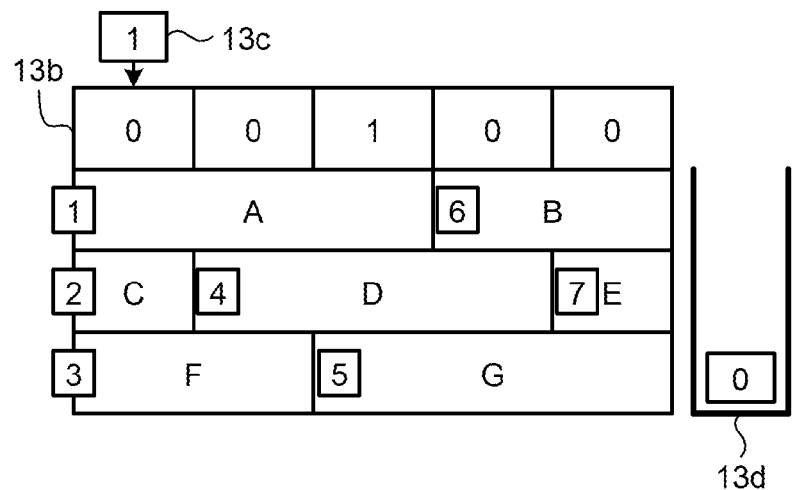
FIG. 6 is a diagram for explaining an example of a process executed by the extraction device according to the first embodiment.

The counter control unit 14e controls increase and decrease of the value of the counter 13c. For example, when an episode generated by the generation unit 14c is selected, the counter control unit 14e stores the value of the counter 13c into the stack 13d. FIG. 6 is a diagram for explaining an example of a process executed by the extraction device according to the first embodiment. For example, in the case illustrated in the example of FIG. 4, the value of the counter 13c is "0". Accordingly, the counter control unit 14e stores the value "0" of the counter 13c into the stack 13d, as illustrated in the example of FIG. 6. The counter control unit 14e then increments the value of the counter 13c by one. For example, as illustrated in the example of FIG. 6, the counter control unit 14e increments the value "0" of the counter 13c by one to update the value of the counter 13c to "1". Next, the counter control unit 14e increments by one the value of the point management variable in the rightmost column of the row in which the identifier of the selected candidate event is registered in the interval table 13b.

If the generation unit 14c described above has determined that the column to be processed is not the leftmost column of the row in which the identifier of the selected candidate event e is registered, the counter control unit 14e performs the following process. That is, the counter control unit 14e updates the value of the counter 13c by subtracting the value of the point management variable in the column to be processed from the value of the counter 13c. Then, the counter control unit 14e moves the position of the column to be processed to the column on the immediate right.

When the backtrack processing unit 14d described above has selected the generated episode, the counter control unit 14e performs the following process. That is, the counter control unit 14e acquires the count value last stored in the stack 13d, and sets the counter 13c to the acquired count value to restore the value of the counter 13c from the stack 13d. Thereafter, the counter control unit 14e decrements by one the value of the point management variable in the column corresponding to the right end of the row in which the identifier of the deleted event is registered in the interval table 13b.

When the counter control unit 14e has incremented the value of the point management variable by one, the extraction unit 14f calculates the frequency of the generated pattern. For example, the extraction unit 14f calculates, as the frequency, a value of "1" if a minimal occurrence of the generated episode exists, or a value of "0" if no minimal occurrence of the generated episode exists. Here, the minimal occurrence refers to the minimum time interval during which events ranging from the event in the part at the start of the episode to the event in the part at the end of the episode exist in a pattern of events represented by the event data 13a. The frequency is also called "binary frequency". The extraction unit 14f determines whether the calculated frequency is "1". If the calculated frequency is "1", the extraction unit 14f determines that the episode occurs frequently. If the calculated frequency is not "1", that is, "0", the extraction unit 14f determines that the episode does not occur frequently.

Although a case will be described below in which the device disclosed herein calculates the "binary frequency" as the frequency, the device disclosed herein is not limited to this. For example, if the frequency is such that the frequency of children is not more than the frequency of parents in the enumeration tree, the device disclosed herein can calculate a frequency other than the binary frequency, and, based on the calculated frequency, can determine whether the episode occurs frequently. A "window frequency" is an example of such a frequency. The "window frequency" refers to the number of intervals including the minimal occurrence among a predetermined set of intervals, or the number of intervals including the minimal occurrence among a set of a plurality of intervals in which adjacent intervals partially overlap each other. In the case of calculating the "window frequency" as the frequency, the extraction unit 14f can determine whether the episode occurs frequently by determining whether the "window frequency" of the episode is a predetermined threshold or more.

A "non-overlapping minimal occurrence frequency" is another example. The "non-overlapping minimal occurrence frequency" refers to the maximum number of minimal occurrences that do not overlap each other in time (that do not include the same time as each other). In the case of calculating the "non-overlapping minimal occurrence frequency" as the frequency, the extraction unit 14f can determine whether the episode occurs frequently by determining whether the "non-overlapping minimal occurrence frequency" of the episode is a predetermined threshold or more. The extraction unit 14f extracts, as an episode to be displayed, the episode that is determined to occur frequently. For example, the extraction unit 14f extracts, as the episode to be displayed, the episode 31 illustrated in FIG. 5 that is determined to occur frequently.

The display control unit 14g controls the display of the display unit 12 so as to display various types of information. For example, the display control unit 14g controls the display of the display unit 12 so as to display the episode, such as the episode 31, extracted by the extraction unit 14f.

A description will next be made of specific examples of processes executed by the extraction device 10, with reference to FIGS. 7 to 14. FIGS. 7 to 14 are diagrams for explaining the examples of the processes executed by the extraction device according to the first embodiment.

For example, after the episode 31 is displayed on the display unit 12, the extraction device 10 selects the event C that serves as a candidate event to be added to the selected episode 31.

Figure 7:
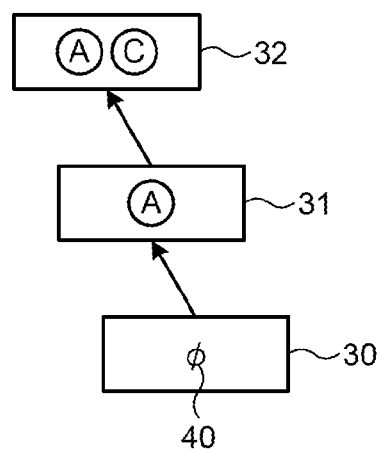
FIG. 7 is a diagram for explaining an example of a process executed by the extraction device according to the first embodiment.

Here, as illustrated in FIG. 6, in the interval table 13b, the column to be processed is the first column, and the leftmost column of a row in which the identifier C of the selected candidate event is registered is the first column. Therefore, the extraction device 10 determines that the column to be processed is the leftmost column of the selected candidate event, and sets, as an addition candidate, the event C that is the selected candidate event. The value "1" of the counter 13c is less than the threshold "2" as illustrated in FIG. 6. Accordingly, the extraction device 10 performs the following process. That is, as illustrated in FIG. 7, the extraction device 10 generates an episode 32 by adding the selected candidate event (event C) to the selected part of the selected episode 31.

Figure 8:
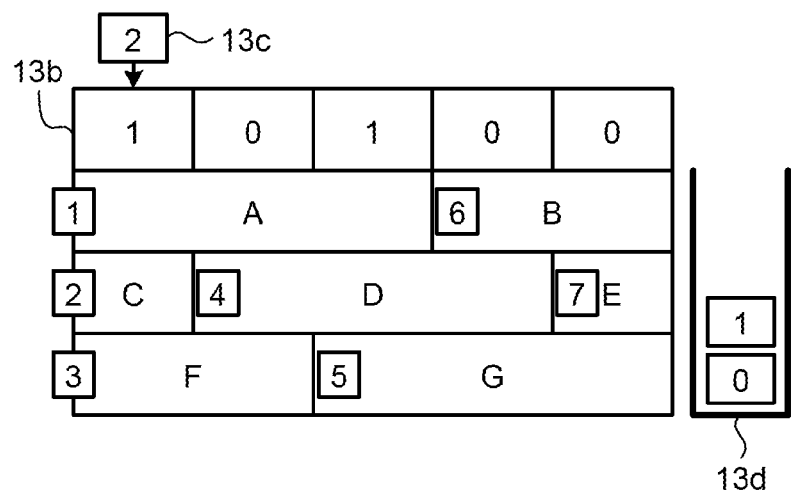
FIG. 8 is a diagram for explaining an example of a process executed by the extraction device according to the first embodiment.

Then, as illustrated in FIG. 8, the extraction device 10 stores the value "1" of the counter 13c into the stack 13d, and increments the value "1" of the counter 13c by one to update the value of the counter 13c to "2". Then, the extraction device 10 increments by one the value of the point management variable in the third column that is the rightmost column of the identifier C of the selected candidate event, and thus sets the value of the point management variable to "1" in the interval table 13b.

Next, the extraction device 10 extracts the episode 32 because the episode 32 occurs frequently. The extraction device 10 then displays the episode 32 on the display unit 12.

Next, the extraction device 10 selects the event F that serves as a candidate event to be added to the selected episode 32. Here, as illustrated in FIG. 8, in the interval table 13b, the column to be processed is the first column, and the leftmost column of a row in which the identifier F of the selected candidate event is registered is the first column. Therefore, the extraction device 10 determines that the column to be processed is the leftmost column of the selected candidate event, and sets, as an addition candidate, the event F that is the selected candidate event.

Figure 9:
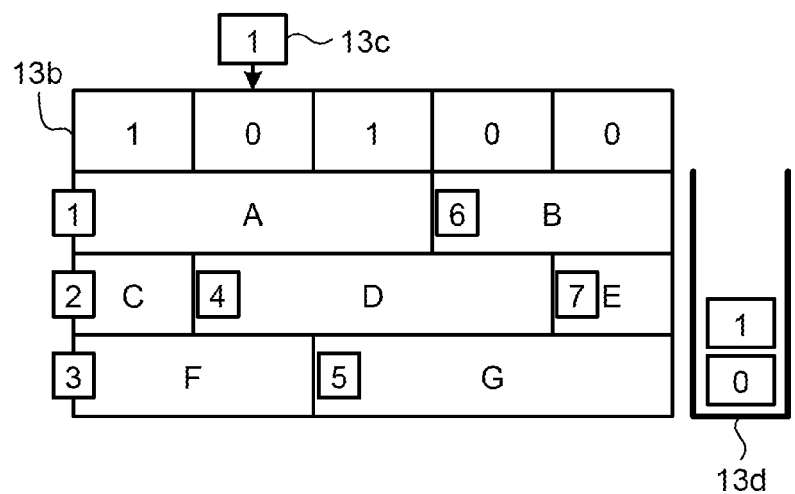
FIG. 9 is a diagram for explaining an example of a process executed by the extraction device according to the first embodiment.

Here, as illustrated in FIG. 8, the value "2" of the counter 13c is not less than the threshold "2". This causes the extraction device 10 to perform the following process. That is, the extraction device 10 selects the event D as a candidate event. In this case, as illustrated in FIG. 8, the column to be processed is the first column, and the leftmost column of a row in which the identifier D of the selected candidate event is registered is the second column. Therefore, the extraction device 10 determines that the column to be processed is not the leftmost column of the selected candidate event. Next, the extraction device 10 subtracts the value "1" of the point management variable in the column to be processed from the value "2" of the counter 13c, and sets the counter 13c to the obtained value "1" as illustrated in FIG. 9. The extraction device 10 then moves the position of the column to be processed to the column on the immediate right.

Then, the extraction device 10 determines again whether the column to be processed is the leftmost column of the row in which the identifier of the selected candidate event is registered. In this case, as illustrated in FIG. 9, the column to be processed is the second column, and the leftmost column of the row in which the identifier D of the selected candidate event is registered is the second column. Therefore, the extraction device 10 determines that the column to be processed is the leftmost column of the row in which the identifier of the selected candidate event is registered.

Figure 10:
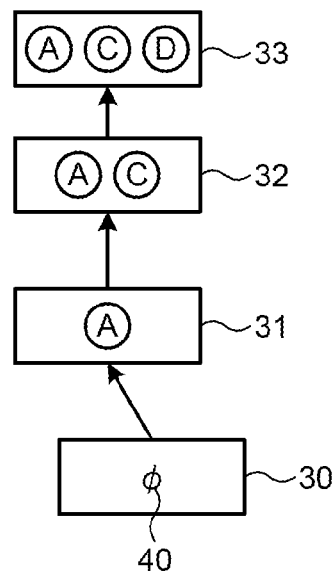
FIG. 10 is a diagram for explaining an example of a process executed by the extraction device according to the first embodiment.

As illustrated in FIG. 9, the value "1" of the counter 13c is less than the threshold "2". This causes the extraction device 10 to subsequently add the selected candidate event (event D) to the selected part of the selected episode 32 to generate an episode 33 as illustrated in FIG. 10.

Figure 11:
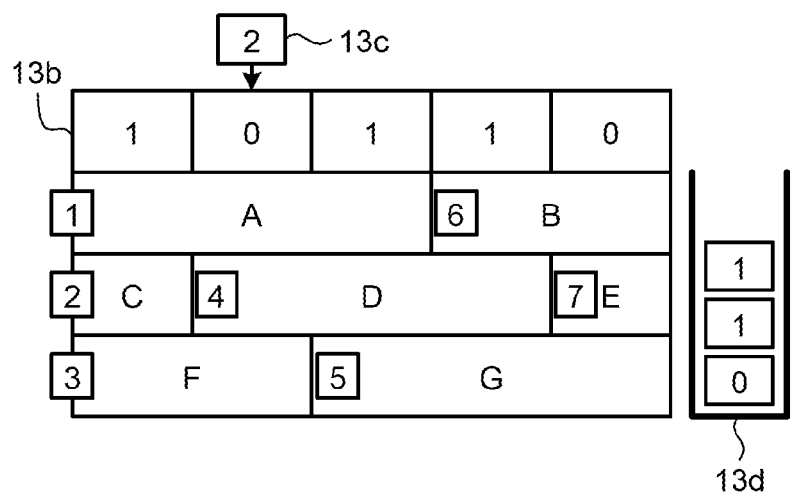
FIG. 11 is a diagram for explaining an example of a process executed by the extraction device according to the first embodiment.

Then, as illustrated in FIG. 11, the extraction device 10 stores the value "1" of the counter 13c into the stack 13d, and increments the value "1" of the counter 13c by one to update the value of the counter 13c to "2". Then, as illustrated in FIG. 11, the extraction device 10 increments by one the value of the point management variable in the fourth column that is the rightmost column of the identifier D of the selected candidate event, and thus sets the value of the point management variable to "1" in the interval table 13b.

Figure 12:
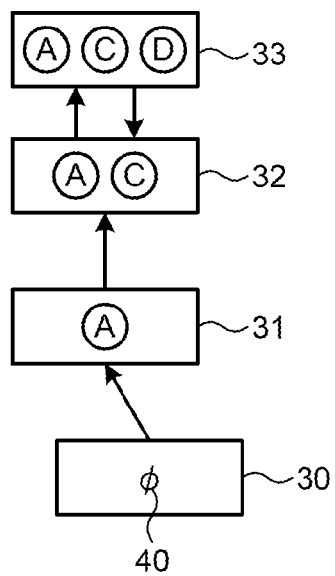
FIG. 12 is a diagram for explaining an example of a process executed by the extraction device according to the first embodiment.

At this time, the extraction device 10 determines that the episode 33 is not a frequently occurring episode because the episode 33 does not occur frequently. Then, as illustrated in FIG. 12, the extraction device 10 generates the episode 32 by deleting the selected candidate event (event D) from the episode 33, and selects the episode 32.

Figure 13:
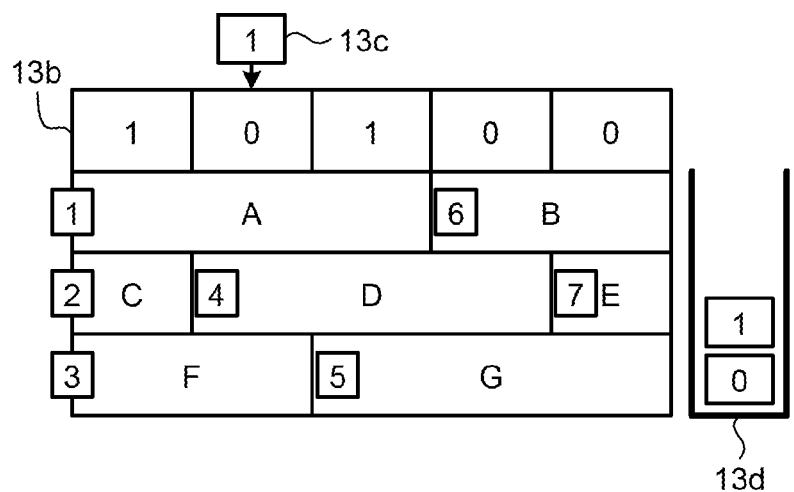
FIG. 13 is a diagram for explaining an example of a process executed by the extraction device according to the first embodiment.

Next, as illustrated in FIG. 13, the extraction device 10 acquires the count value "1" last stored in the stack 13d, and sets the counter 13c to the acquired count value "1" to restore the value of the counter 13c from the stack 13d. Furthermore, as illustrated in FIG. 13, the extraction device 10 decrements by one the value "1" of the point management variable corresponding to the right end of the row in which the identifier D of the deleted event is registered, and thus sets the value of the point management variable to "0" in the interval table 13b. Then, the extraction device 10 performs the subsequent processes.

The control unit 14 is an integrated circuit such as an application-specific integrated circuit (ASIC) or a field-programmable gate array (FPGA), or an electronic circuit such as a central processing unit (CPU) or a microprocessing unit (MPU).

Procedure of Processes

Figure 14:
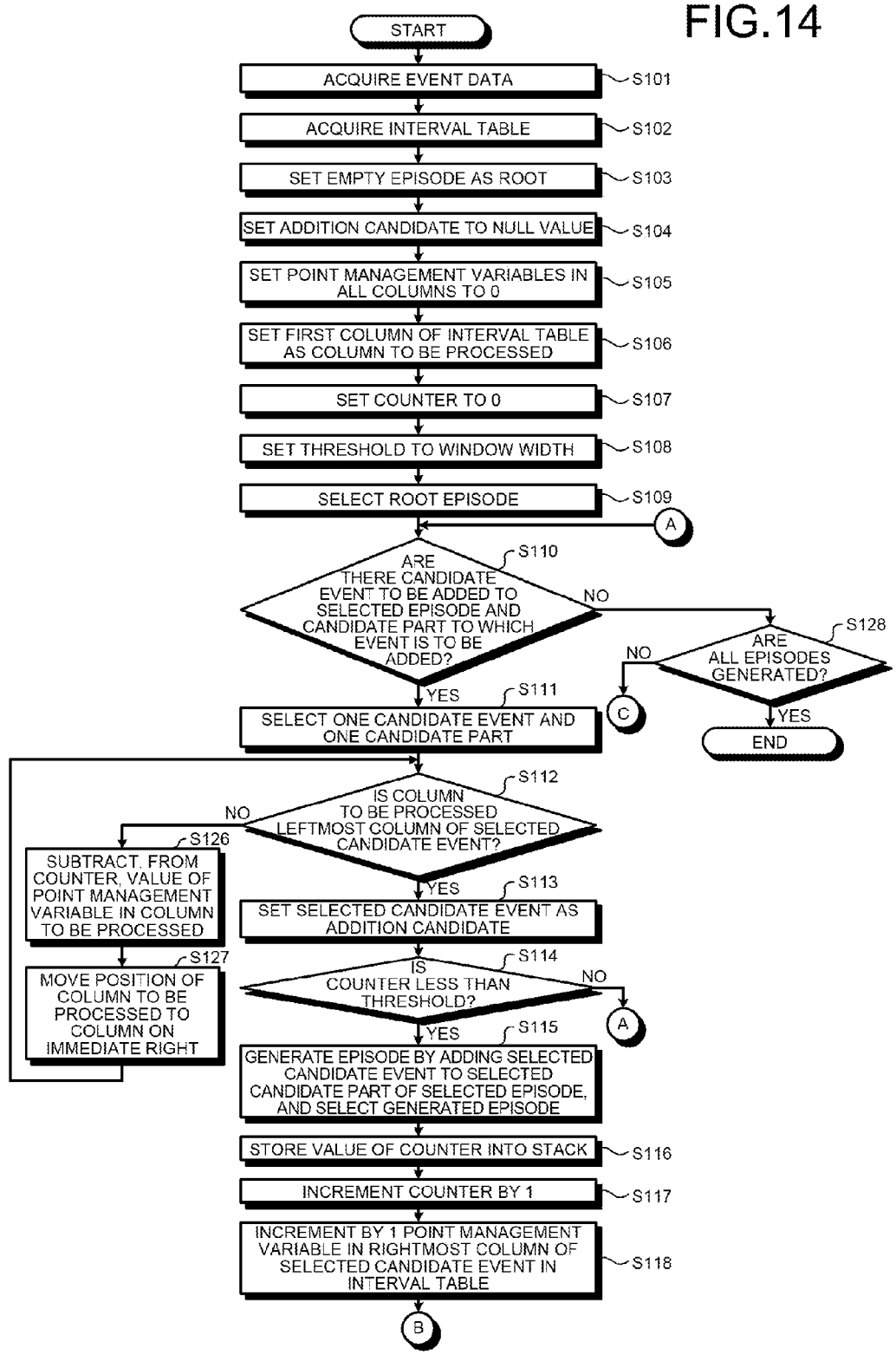
FIG. 14 is a flowchart illustrating the procedure of an extraction process according to the first embodiment.
Figure 15:
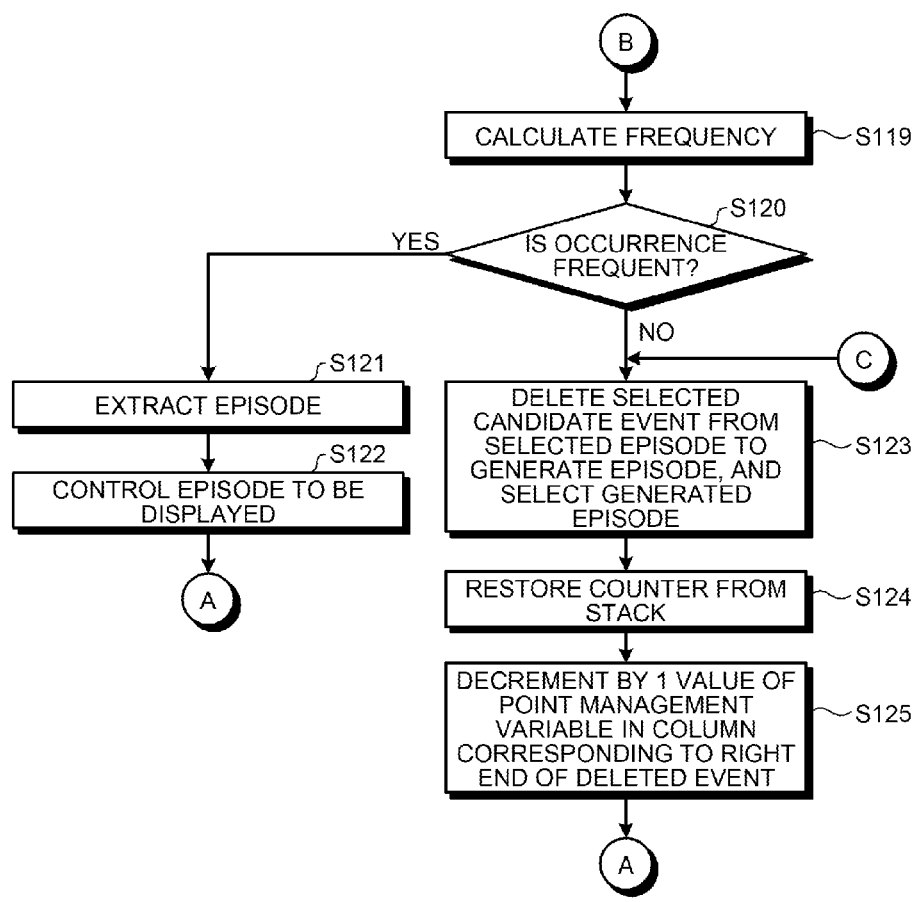
FIG. 15 is a flowchart illustrating the procedure of the extraction process according to the first embodiment.

A description will next be made of the procedure of the processes of the extraction device 10 according to the present embodiment. FIGS. 14 and 15 are flowcharts illustrating the procedure of the extraction process according to the first embodiment. Various types of timing can be considered as execution timing of the extraction process. For example, the control unit 14 executes the extraction process when an instruction to execute the extraction process is entered from the input unit 11.

As illustrated in FIG. 14, the acquisition unit 14a acquires the event data 13a from the storage unit 13 (S101). Next, the acquisition unit 14a acquires the interval table 13b from the storage unit 13 (S102).

The initialization unit 14b sets the empty episode 40 as the root episode 30 (S103). Next, the initialization unit 14b initializes the addition candidate by setting the addition candidate to the null value (S104).

Then, the initialization unit 14b sets the values of the point management variables in all of the columns of the interval table 13b to "0", thus initializing the point management variables (S105). Next, the initialization unit 14b sets the first column as a column to be processed (S106).

Then, the initialization unit 14b initializes the counter 13c by setting the value of the counter 13c to "0" (S107). Next, the initialization unit 14b sets the threshold to the value of the window width (S108).

Next, the generation unit 14c selects the root episode 30 (S109). Next, the generation unit 14c determines whether there are a candidate event to be added to the selected episode and a candidate part to which the event is to be added (S110).

If there are a candidate event to be added to the selected episode and a part to which the event is to be added (Yes at S110), the generation unit 14c selects one candidate event and one candidate part (S111).

Next, the generation unit 14c determines whether, in the interval table 13b, the column to be processed is the leftmost column of a row in which the identifier of the selected candidate event e is registered (S112). If the column to be processed is the leftmost column of the row in which the identifier of the selected candidate event e is registered (Yes at S112), the generation unit 14c sets the selected candidate event as the addition candidate (S113). Next, the generation unit 14c determines whether, in the interval table 13b, the value of the counter 13c is less than the threshold "2" (S114).

If the value of the counter 13c is not less than the threshold "2" (No at S114), the process returns to S110.

If, instead, the value of the counter 13c is less than the threshold "2" (Yes at S114), the generation unit 14c generates an episode by adding the selected candidate event to the selected candidate part of the selected episode, and selects the generated episode (S115).

Next, the counter control unit 14e stores the value of the counter 13c into the stack 13d (S116). Then, the counter control unit 14e increments the value of the counter 13c by one (S117). Next, the counter control unit 14e increments by one the value of the point management variable in the rightmost column of the row in which the identifier of the selected candidate event is registered in the interval table 13b (S118).

Then, the extraction unit 14f calculates the frequency of the generated pattern (S119). Then, the extraction unit 14f determines whether the calculated frequency is "1" to determine whether the episode occurs frequently (S120). If the episode occurs frequently (Yes at S120), the extraction unit 14f extracts, as an episode to be displayed, the episode that is determined to occur frequently (S121). Then, the display control unit 14g controls the display of the display unit 12 so as to display the extracted episode (S122), and the process returns to S110.

If, instead, the episode does not occur frequently (No at S120), the backtrack processing unit 14d deletes from the generated episode the selected candidate event, that is, the last added event, to generate an episode, and selects the thus generated episode (S123).

Then, the counter control unit 14e acquires the count value last stored in the stack 13d, and sets the counter 13c to the acquired count value to restore the value of the counter 13c from the stack 13d (S124). Thereafter, the counter control unit 14e decrements by one the value of the point management variable in the column corresponding to the right end of the row in which the identifier of the deleted event is registered in the interval table 13b (S125), and the process returns to S110.

If the column to be processed is not the leftmost column of the row in which the identifier of the selected candidate event e is registered (No at S112), the counter control unit 14e performs the following process. That is, the counter control unit 14e updates the value of the counter 13c by subtracting the value of the point management variable in the column to be processed from the value of the counter 13c (S126). Then, the counter control unit 14e moves the position of the column to be processed to the column on the immediate right (S127), and the process returns to S112.

If there is no candidate event to be added or no candidate part to which the event is to be added (No at S110), the generation unit 14c performs the following process. That is, the generation unit 14c determines whether all the episodes are generated except episodes that are no longer generated because of the pruning (S128). If all the episodes are generated except episodes that are no longer generated because of the pruning (Yes at S128), the process is terminated. If, instead, it is not determined that all the episodes are generated except episodes that are no longer generated because of the pruning (No at S128), the process proceeds to S123.

As described above, the extraction device 10 according to the present embodiment includes the storage unit 13 storing therein the interval table 13b. The interval table 13b is a table in which mutually exclusive events are arranged in the same column, adjacent events of the same type are joined together, and the events are given sequences in the order of occurrence thereof. With reference to the interval table 13b, the extraction device 10 generates a new episode by adding an event to a selected episode including events according to the sequential order in such a manner that the new episode is generated by adding the event if the value of the counter 13c is less than the threshold "2". Then, if the event is added, the extraction device 10 adds the predetermined value "1" to the value of the counter 13c and adds the predetermined value "1" to the value of the point management variable in the rightmost column of the added event among the point management variables corresponding to the respective columns of the interval table 13b. The extraction device 10 then extracts the new episode that satisfies a predetermined condition. Next, when an event in the second or subsequent column in the interval table 13b is added, the extraction device 10 subtracts, from the value of the counter 13c, the value of the point management variable in a column immediately before the leftmost column of the event to be added, and thereby updates the value of the counter 13c that is to be compared with the threshold "2". In this manner, when the counter 13c has a value less than the threshold "2", the extraction device 10 generates an episode by adding a selected candidate event e to a selected candidate part of a selected episode. The extraction device 10 does not generate a new episode when the counter 13c has a value not less than the threshold "2". This comes from the following reason. That is, as described above, the event data 13a includes a plurality of pieces of data each representing a pattern of events indicated by data including information and answers of a respondent who has replied to a questionnaire. As a result, a combination of mutually exclusive events also occurs in the pattern of events represented by the event data 13a, although the combination of mutually exclusive events does not occur in any pattern of events indicating information and answers of a respondent who has replied to one questionnaire. The extraction device 10 according to the present embodiment does not generate a pattern that includes a number (larger than the size of the window width) of combinations of events that do not occur in the pattern of events indicated by data including information and answers of a respondent who has replied to one questionnaire. This keeps the extraction device 10 according to the present embodiment from performing unnecessary processes, such as the process to calculate the frequency of patterns including the combinations of mutually exclusive events and the process to determine whether such patterns occur frequently. This, in turn, allows the extraction device 10 according to the present embodiment to efficiently extract the patterns.

In addition, the extraction device 10 according to the present embodiment uses one counter, that is, the counter 13c to perform the comparison with the threshold "2", and thus can perform the comparison with the threshold using simple processing. This enables the extraction device 10 to extract patterns using simple processing.

Second Embodiment

Configuration of Extraction Device

Figure 16:
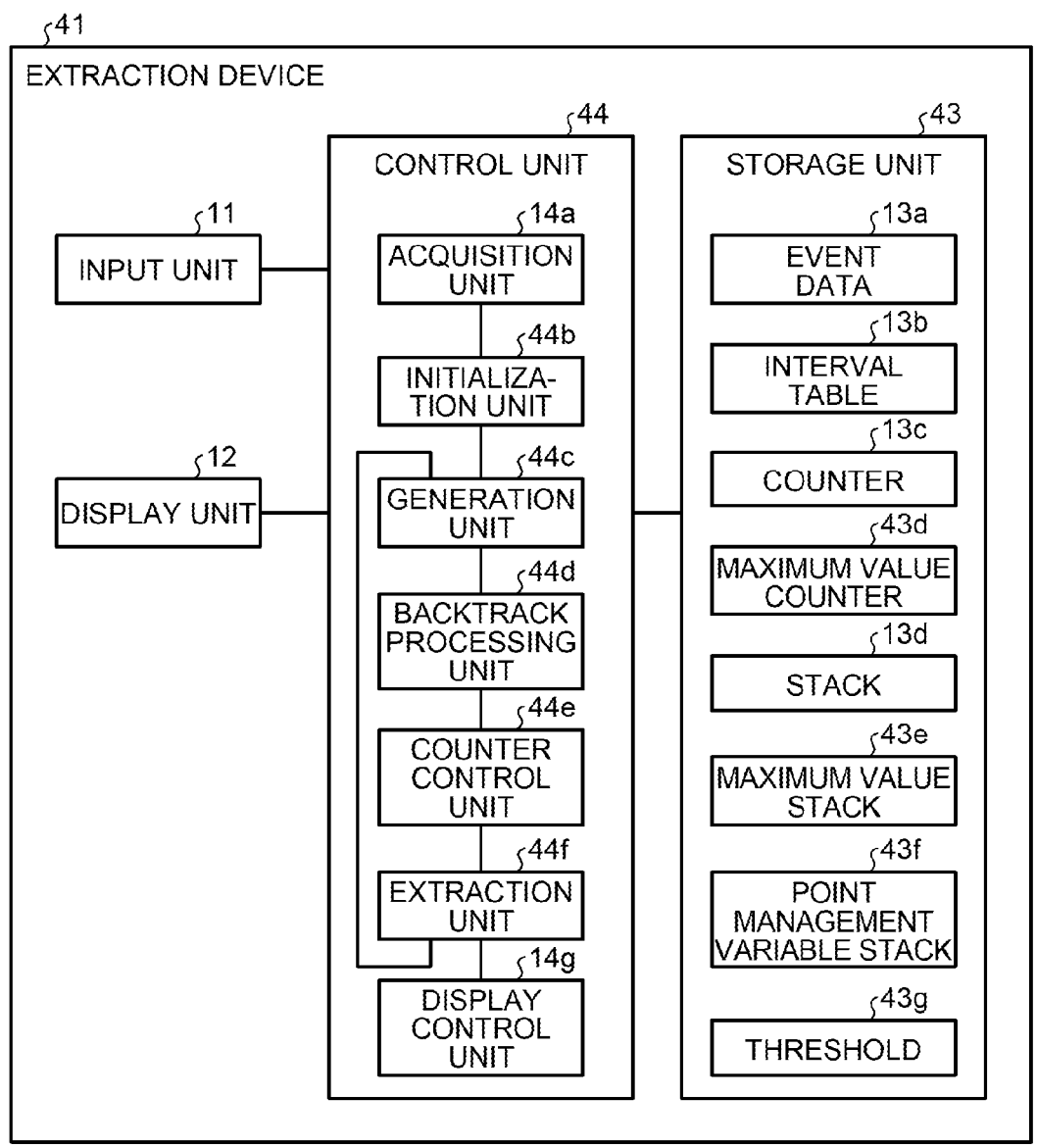
FIG. 16 is a diagram illustrating an example of a functional configuration of an extraction device according to a second embodiment of the present invention.

A description will next be made of an extraction device according to a second embodiment of the present invention. As illustrated in FIG. 16, an extraction device 41 includes a storage unit 43 and a control unit 44. The storage unit 43 differs from the storage unit 13 according to the first embodiment illustrated in FIG. 1 in that the storage unit 43 further stores therein a maximum value counter 43d, a maximum value stack 43e, a point management variable stack 43f, and a threshold 43g as memory contents. The control unit 44 differs from the control unit 14 according to the first embodiment illustrated in FIG. 1 in that the control unit 44 includes an initialization unit 44b, a generation unit 44c, a backtrack processing unit 44d, a counter control unit 44e, and an extraction unit 44f. Note that, hereinafter, the same numerals as those in FIG. 1 will be given to units and devices performing the same functions as those of the first embodiment above, and descriptions thereof may be omitted.

The input unit 11 enters information into the control unit 44. For example, the input unit 11 accepts an instruction from the user, and enters, into the control unit 44, an instruction to execute the extraction process. The input unit 11 also accepts an instruction from the user, and enters, into the control unit 44, an instruction to acquire the event data 13a to be described later from a predetermined server. The input unit 11 accepts an operation from the user, and supplies the interval table 13b into the control unit 44. A keyboard and a mouse are examples of devices of the input unit 11.

The display unit 12 displays thereon various types of information. For example, the display unit 12 displays thereon an episode extracted by the extraction unit 44f to be described later under the control of the display control unit 14g to be described later.

The storage unit 43 stores therein the event data 13a, the interval table 13b, the counter 13c, and the stack 13d, in the same manner as in the first embodiment. In addition, the storage unit 43 stores therein the maximum value counter 43d, the maximum value stack 43e, the point management variable stack 43f, and the threshold 43g.

The maximum value counter 43d registers therein the time in which mutually exclusive events included in an episode to which an event is added occur in a pattern of events represented by the event data 13a.

The maximum value stack 43e stores therein the value of the maximum value counter 43d before being updated, each time the value of the maximum value counter 43d is updated.

When an event is added to an episode to generate a new episode, the point management variable stack 43f stores therein the values of the point management variables in all of the columns if the added event is behind any event of the episode to which the event is to be added.

The threshold 43g registers a value of a threshold used in a process performed by the generation unit 44c to be described later to determine whether the value of the counter 13c is less than the threshold.

The control unit 44 includes an internal memory for storing therein programs defining various processing procedures and control data, and performs various processes using these programs and the control data. The control unit 44 includes the acquisition unit 14a, the initialization unit 44b, the generation unit 44c, the backtrack processing unit 44d, the counter control unit 44e, the extraction unit 44f, and the display control unit 14g.

Figure 17:
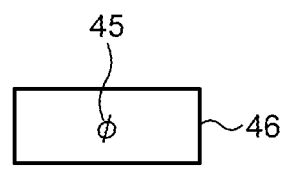
FIG. 17 is a diagram for explaining an example of a process executed by the extraction device according to the second embodiment.

The initialization unit 44b performs various types of initialization. For example, when the acquisition unit 14a has acquired the event data 13a and the interval table 13b, the initialization unit 44b sets an empty episode as the first parent, that is, the root in the enumeration tree. FIG. 17 is a diagram for explaining an example of a process executed by the extraction device according to the second embodiment. As illustrated in the example of FIG. 17, the initialization unit 44b sets an empty episode 45 as a root episode 46. The initialization unit 44b sets a definite portion to be empty.

Next, when an event is added to the episode to generate a new episode, the initialization unit 44b sets a null value for an addition candidate that is a candidate event to be added, thus initializing the addition candidate.

Figure 18:
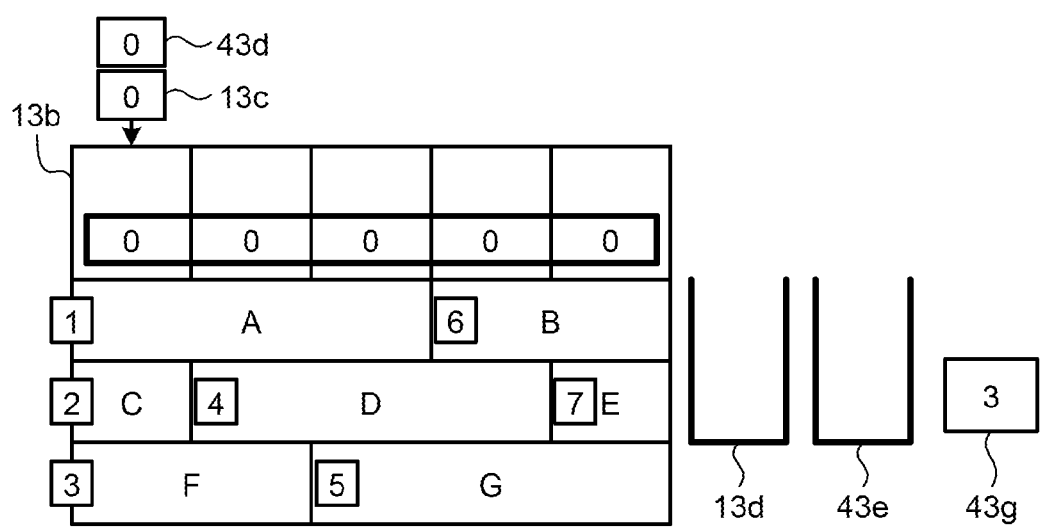
FIG. 18 is a diagram for explaining an example of a process executed by the extraction device according to the second embodiment.

Next, the initialization unit 44b sets the value of the maximum value counter 43d to "0", thus initializing the value of the maximum value counter 43d. Then, the initialization unit 44b sets the values of the point management variables in all of the columns of the interval table 13b to "0", thus initializing the point management variables. FIG. 18 is a diagram for explaining an example of a process executed by the extraction device according to the second embodiment. For example, as illustrated in the example of FIG. 18, the initialization unit 44b sets the values of the point management variables in all of the columns of the interval table 13b to "0".

Next, the initialization unit 44b sets the first column as a column to be processed. For example, the initialization unit 44b sets the column to be processed at the first column (column in which the combination of the events A, C, and F is registered) of the interval table 13b illustrated in the example of FIG. 18.

The initialization unit 44b then initializes the counter 13c by setting the value of the counter 13c to "0" as illustrated in FIG. 18. Next, the initialization unit 44b sets, to a value described below, the value of the threshold 43g that is used in a process performed by the generation unit 44c to be described later to determine whether the value of the counter 13c is less than the value of the threshold 43g. That is, the initialization unit 44b sets the value of the threshold 43g to a value of a window width that is used when an episode is extracted and that is a temporal width used in searching for an event pattern of the event data 13a. The window width is, for example, "3" in the case of attempting to extract event patterns that have occurred during time (2 to 4) from time "2" to time "4". Although a case will be described below in which the window width is "3", the window width is not limited to this. The initialization unit 44b sets the threshold 43g to the value of "3" as illustrated in FIG. 18.

The generation unit 44c generates various patterns. An embodiment of the generation unit 44c will be described. The generation unit 44c first selects the root episode 46.

Then, the generation unit 44c determines whether there are a candidate event to be added to the selected episode and a candidate part to which the event is to be added. Here, in the present embodiment, if the episode is set to be the definite portion, the event is added behind or in front of the definite portion. The definite portion refers to an episode whose descendant episode is to have no new event added thereto. The following description gives an example in which the event is added behind the definite portion if the episode is set to be the definite portion. In the present embodiment, if the episode is set to be the definite portion, the order of addition of events is initialized, and the event to be added first is selected as the candidate event. In the present embodiment, a case will be described in which the empty episode 46 includes a first part and a second part. The empty episode 46 includes the two parts, and therefore, a descendant episode of the empty episode 46 also includes the two parts. In this case, according to the order of events to be added indicated by the interval table 13b, the generation unit 44c identifies one candidate event to be added to the selected episode. Then, when the identified candidate event is not selected in a combination with either of the parts of the selected episode, or with the part behind the definite portion, the generation unit 44c makes a determination as follows. That is, the generation unit 44c determines that there are a candidate event to be added to the selected episode and a candidate part to which the event is to be added. Note that the present embodiment assumes that the same events are not included in the same part. When, instead, there is no unselected candidate event in either of the combinations with the parts of the selected episode, or in the combination with the part behind the definite portion, the generation unit 44c determines that there is no candidate event to be added to the selected episode. For example, when the root episode 46 illustrated in FIG. 17 is selected, the event A serving as the event to be added first is not selected in any combination with any of the parts of the episode 46. This causes the generation unit 44c to determine that there are the event A to be added to a part of the selected episode 46 and a part (either of the first part and the second part) to which the event A is to be added.

In the case in which the display of the display unit 12 is controlled so as to display the episode by the display control unit 14g, the generation unit 44c determines, in the same way, whether there are a candidate event to be added to the selected episode and a candidate part to which the event is to be added. Also, in the case in which the counter control unit 44e has added a counter maximum value to the value of the threshold 43g, or in the case in which a deleted event is determined to be not the last event of the episode before the deletion, the generation unit 44c performs the same processing. In other words, the generation unit 44c determines whether there are a candidate event to be added to the selected episode and a part to which the event is to be added.

When there are a candidate event to be added to the selected episode and a part to which the event is to be added, the generation unit 44c selects one candidate event and one candidate part. For example, in the example of FIG. 17, when the event A to be added to the selected episode 46, and either of the first part and the second part to which the event is to be added exist, the generation unit 44c selects the event A as the candidate event. In addition, the generation unit 44c selects, as the candidate part, the first part that has a smaller order number between the first and the second parts to which the event can be added. In the following description, the candidate event may be expressed as a "candidate event e".

Next, the generation unit 44c determines whether, in the interval table 13b, the column to be processed is the leftmost column of a row in which the identifier of the selected candidate event e is registered. For example, in the case illustrated in FIG. 18, a case will be described in which the column to be processed is the first column, and the selected candidate event e is the event A. In this case, the leftmost column of the row in which the identifier A of the selected candidate event e is registered is in the first row. Therefore, in that case, the generation unit 44c determines that, in the interval table 13b, the column to be processed is the leftmost column of the row in which the identifier A of the selected candidate event e is registered. It is to be noted that, when the counter control unit 44e has moved the position of the column to be processed to the column on the immediate right, the generation unit 44c also determines whether the column to be processed is the leftmost column of the row in which the identifier of the selected candidate event e is registered.

When the column to be processed is the leftmost column of the row in which the identifier of the selected candidate event e is registered, the generation unit 44c sets the selected candidate event as the addition candidate.

Next, the generation unit 44c determines whether the place of addition of the selected candidate event e is behind the other events included in the selected episode. When the place of addition of the selected candidate event e is behind the other events included in the selected episode, the generation unit 44c determines whether the value of the maximum value counter 43d is less than the value "3" of the threshold 43g. For example, in the case illustrated in FIG. 18, the generation unit 44c determines that the value "0" of the maximum value counter 43d is less than the value "3" of the threshold 43g. In the following description, the value of the maximum value counter 43d may be expressed as "counter maximum value". When the counter maximum value is not less than the value "3" of the threshold 43g, the generation unit 44c performs the above-described process to determine whether there are a candidate event to be added to the selected episode and a candidate part to which the event is to be added, and performs the processes following that process.

When, instead, the counter maximum value is less than the value "3" of the threshold 43g, the generation unit 44c updates the value of the threshold 43g by subtracting the counter maximum value from the value "3" of the threshold 43g. For example, in the case illustrated in the example of FIG. 18, the generation unit 44c subtracts the counter maximum value "0" from the value "3" of the threshold 43g.

Next, the generation unit 44c stores the values of the point management variables in all of the columns into the point management variable stack 43f. The generation unit 44c then sets the values of the point management variables in all of the columns to "0". The generation unit 44c subsequently moves the position of the column to be processed to the column on the immediate right. Thereafter, the generation unit 44c renders the selected episode to be a definite portion. In other words, the generation unit 44c sets the episode to be the definite portion.

If the episode is set to be the definite portion, or if the place of addition of the selected candidate event e is not behind the other events included in the selected episode, the generation unit 44c performs the following process. That is, the generation unit 44c determines whether, in the interval table 13b, the value of the counter 13c is less than the value "3" of the threshold 43g. For example, in the case illustrated in the example of FIG. 18, the value of the counter 13c is "0".

Therefore, the generation unit 44c determines that the value "0" of the counter 13c is less than the value "3" of the threshold 43g.

When the value of the counter 13c is not less than the value "3" of the threshold 43g, the generation unit 44c performs the above-described process to determine whether there are a candidate event to be added to the selected episode and a candidate part to which the event is to be added, and performs again the processes following that process.

Figure 19:
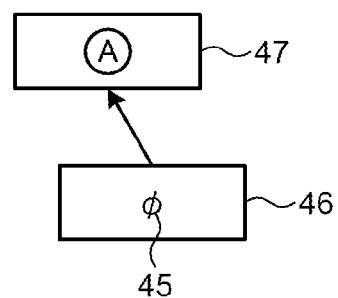
FIG. 19 is a diagram for explaining an example of a process executed by the extraction device according to the second embodiment.

When, instead, the value of the counter 13c is less than the value "3" of the threshold 43g, the generation unit 44c generates an episode by adding the selected candidate event to the selected candidate part of the selected episode. The generation unit 44c then selects the generated episode. FIG. 19 is a diagram for explaining an example of a process executed by the extraction device according to the second embodiment. For example, as illustrated in the example of FIG. 19, the generation unit 44c generates an episode 47 by adding the event A that is the selected candidate event to the selected candidate part of the selected episode 46. The generation unit 44c then selects the generated episode 47.

In this manner, in the present embodiment, when the counter 13c has a value less than the value "3" of the threshold 43g, an episode is generated by adding a selected candidate event e to a selected candidate part of a selected episode. In the present embodiment, no new episode is generated when the counter 13c has a value not less than the value "3" of the threshold 43g. This comes from the following reason. That is, as described above, the event data 13a includes a plurality of pieces of data each representing a pattern of events indicated by data including information and answers of a respondent who has replied to a questionnaire. As a result, a combination of mutually exclusive events also occurs in the pattern of events represented by the event data 13a, although the combination of mutually exclusive events does not occur in any pattern of events indicating information and answers of a respondent who has replied to one questionnaire. The present embodiment does not generate a pattern that includes a number (larger than the size of the window width) of combinations of events that do not occur in the pattern of events indicated by data including information and answers of a respondent who has replied to one questionnaire. This keeps the present embodiment from performing unnecessary processes, such as the process to calculate the frequency of patterns including the combinations of mutually exclusive events and the process to determine whether such patterns occur frequently. This, in turn, allows the present embodiment to efficiently extract the patterns. The process may be called the "pruning" in which no episode is generated when the counter 13c has a value not less than the value "3" of the threshold 43g.

If, as a result of the determination of whether there are a candidate event to be added to the selected episode and a candidate part to which the event is to be added, there is no candidate event to be added or no candidate part to which the event is to be added, the generation unit 44c performs the following process. That is, the generation unit 44c determines whether all the episodes are generated except episodes that are no longer generated because of the pruning. If all the episodes are generated except episodes that are no longer generated because of the pruning, the process is terminated.

The backtrack processing unit 44d performs backtracking. For example, when the extraction unit 44f determines that an episode generated by the generation unit 44c does not occur frequently, the backtrack processing unit 44d deletes the last added event from the episode to generate an episode. Then, the backtrack processing unit 44d selects the generated episode.

When the generation unit 44c does not determine that all the episodes are generated except episodes that are no longer generated because of the pruning, the backtrack processing unit 44d also performs the same processing.

Figure 20:
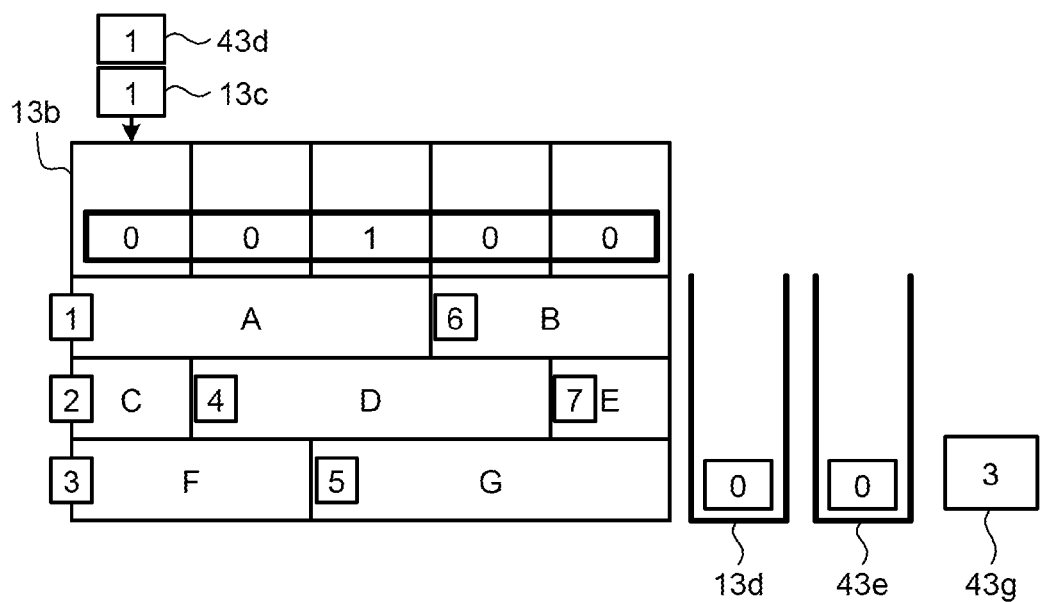
FIG. 20 is a diagram for explaining an example of a process executed by the extraction device according to the second embodiment.

The counter control unit 44e controls increase and decrease of the value of the counter 13c. For example, when an episode generated by the generation unit 44c is selected, the counter control unit 44e stores the value of the counter 13c into the stack 13d. FIG. 20 is a diagram for explaining an example of a process executed by the extraction device according to the second embodiment. For example, in the case illustrated in the example of FIG. 18, the value of the counter 13c is "0". Accordingly, the counter control unit 44e stores the value "0" of the counter 13c into the stack 13d as illustrated in the example of FIG. 20. The counter control unit 44e then increments the value of the counter 13c by one. For example, as illustrated in the example of FIG. 20, the counter control unit 44e increments the value "0" of the counter 13c by one to update the value of the counter 13c to "1".

Next, the counter control unit 44e stores the counter maximum value into the maximum value stack 43e. For example, in the case illustrated in the example of FIG. 18, the counter maximum value, that is, the value of the maximum value counter 43d is "0". Accordingly, the counter control unit 44e stores the counter maximum value "0" into the maximum value stack 43e as illustrated in FIG. 20. The counter control unit 44e then increments the value of the maximum value counter 43d by one. For example, as illustrated in the example of FIG. 20, the counter control unit 44e increments the value "0" of the maximum value counter 43d by one to update the counter maximum value to "1".

Next, the counter control unit 44e increments by one the value of the point management variable in the rightmost column of the row in which the identifier of the selected candidate event is registered in the interval table 13b. For example, when the event A is selected as the candidate event in the case illustrated in FIG. 20, the counter control unit 44e performs the following process. That is, as illustrated in FIG. 20, the counter control unit 44e increments by one the value of the point management variable in the third column that is the rightmost column of the first row in which the identifier A is registered, and thus sets the value of the point management variable to "1" in the interval table 13b.

If the generation unit 44c described above has determined that the column to be processed is not the leftmost column of the row in which the identifier of the selected candidate event e is registered, the counter control unit 44e performs the following process. That is, the counter control unit 44e updates the value of the counter 13c by subtracting the value of the point management variable in the column to be processed from the value of the counter 13c. Then, the counter control unit 44e moves the position of the column to be processed to the column on the immediate right.

When the backtrack processing unit 44d described above has selected the generated episode, the counter control unit 44e performs the following process. That is, the counter control unit 44e acquires the count value last stored in the stack 13d, and sets the counter 13c to the acquired count value to restore the value of the counter 13c from the stack 13d. In addition, the counter control unit 44e acquires the counter maximum value last stored in the maximum value stack 43e, and sets the maximum value counter 43d to the acquired counter maximum value to restore the value of the maximum value counter 43d from the maximum value stack 43e. Thereafter, the counter control unit 44e decrements by one the value of the point management variable in the column corresponding to the right end of the row in which the identifier of the deleted event is registered in the interval table 13b.

Then, the counter control unit 44e determines whether the deleted event is the last event of the episode before the deletion. If the deleted event is the last event, the counter control unit 44e updates the definite portion using, as a new definite portion, the definite portion to which the selected episode is set.

Then, the counter control unit 44e acquires the values of the point management variables in all of the columns last stored in the point management variable stack 43f, and sets the point management variables to the respective values of the acquired point management variables in all of the columns. This restores the values of the acquired point management variables from the point management variable stack 43f. The counter control unit 44e then updates the value of the threshold 43g by adding the counter maximum value to the value of the threshold 43g.

When the counter control unit 44e has incremented the value of the point management variable by one, the extraction unit 44f calculates the frequency of the generated pattern in the same manner as the extraction unit 14f according to the first embodiment. Then, in the same manner as the extraction unit 14f according to the first embodiment, the extraction unit 44f determines whether the calculated frequency is "1". If the calculated frequency is "1", the extraction unit 44f determines that the episode occurs frequently. If the calculated frequency is not "1", that is, "0", the extraction unit 44f determines that the episode does not occur frequently. For example, if the frequency of the episode 47 illustrated in the example of FIG. 19 is "1", the extraction unit 44f determines that the episode 47 occurs frequently. The extraction unit 44f then extracts, as an episode to be displayed, the episode that is determined to occur frequently. For example, the extraction unit 44f extracts the episode 47 as the episode to be displayed.

The display control unit 14g controls the display of the display unit 12 so as to display various types of information. For example, the display control unit 14g controls the display of the display unit 12 so as to display the episode, such as the episode 47, extracted by the extraction unit 44f.

The control unit 44 is an integrated circuit such as an ASIC or an FPGA, or an electronic circuit such as a CPU or an MPU.

A description will next be made of specific examples of processes executed by the extraction device 41 with reference to FIGS. 21 to 31. FIGS. 21 to 31 are diagrams for explaining the examples of the processes executed by the extraction device according to the second embodiment.

For example, after the episode 47 is displayed on the display unit 12, the extraction device 41 selects the event C that serves as a candidate event to be added to the selected episode.

Figure 21:
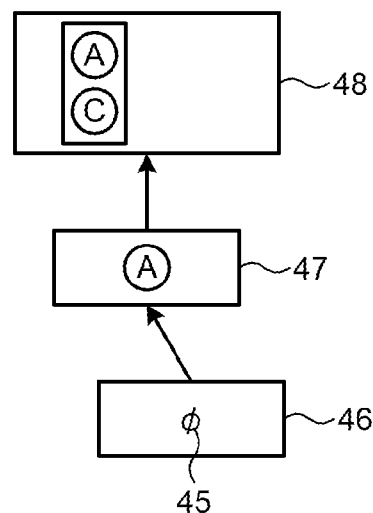
FIG. 21 is a diagram for explaining an example of a process executed by the extraction device according to the second embodiment.

Here, as illustrated in FIG. 20, in the interval table 13b, the column to be processed is the first column, and the leftmost column of a row in which the identifier C of the selected candidate event is registered is the first column. Therefore, the extraction device 41 determines that the column to be processed is the leftmost column of the selected candidate event, and sets, as an addition candidate, the event C that is the selected candidate event. The value "1" of the counter 13c is less than the value "3" of the threshold 43g as illustrated in FIG. 20. Accordingly, the extraction device 41 performs the following process. That is, as illustrated in FIG. 21, the extraction device 41 generates an episode 48 by adding the selected candidate event (event C) to the selected part of the selected episode 47. In this case, the event C is added to the part of the episode 47 that includes the event A.

Figure 22:
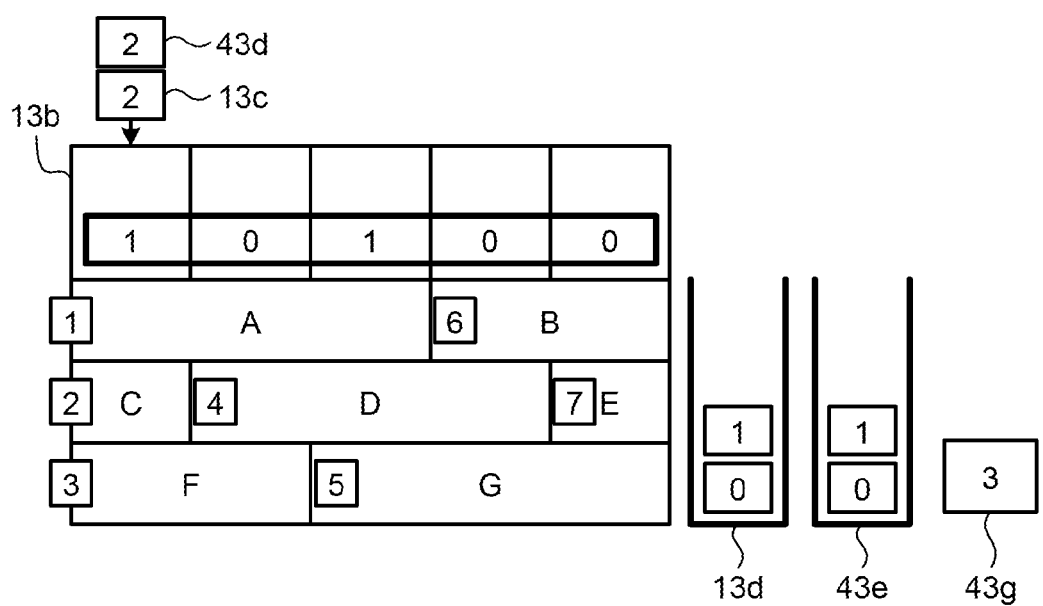
FIG. 22 is a diagram for explaining an example of a process executed by the extraction device according to the second embodiment.

Then, as illustrated in FIG. 22, the extraction device 41 stores the value "1" of the counter 13c into the stack 13d, and increments the value "1" of the counter 13c by one to update the value of the counter 13c to "2". The extraction device 41 stores the value "1" of the maximum value counter 43d into the maximum value stack 43e, and increments the value "1" of the maximum value counter 43d by one to update the value of the maximum value counter 43d to "2". Then, the extraction device 41 increments by one the value of the point management variable in the first column that is the rightmost column of the identifier C of the selected candidate event, and thus sets the value of the point management variable to "1" in the interval table 13b.

Next, the extraction device 41 extracts the episode 48 because the episode 48 occurs frequently. The extraction device 41 then displays the episode 48 on the display unit 12.

Figure 23:
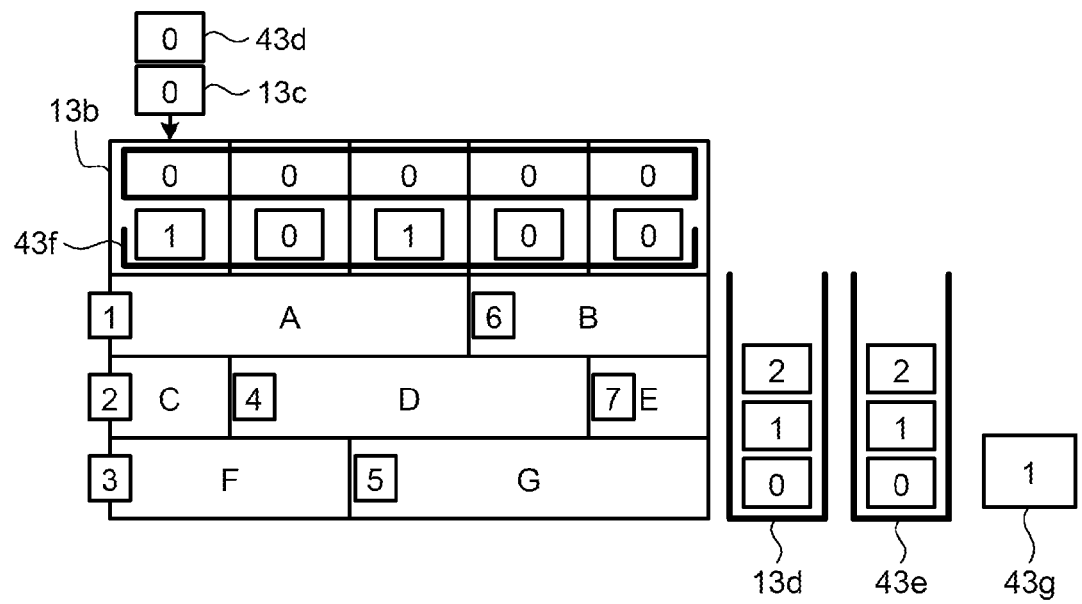
FIG. 23 is a diagram for explaining an example of a process executed by the extraction device according to the second embodiment.
Figure 24:
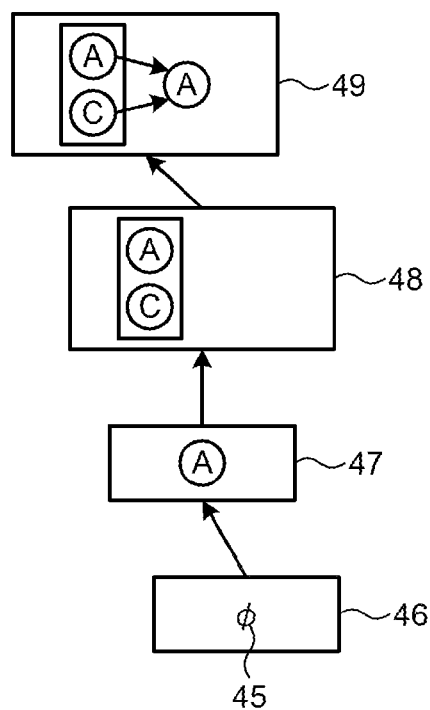
FIG. 24 is a diagram for explaining an example of a process executed by the extraction device according to the second embodiment.

A description will be made here of a case in which a second part is selected as a candidate part of the selected episode 48 to which an event is to be added. In this case, the event to be added is added behind the events A and C included in the first part of the episode 48. Accordingly, the extraction device 41 first determines whether the counter maximum value "2" is less than the value "3" of the threshold 43g. Because the counter maximum value "2" is less than the value "3" of the threshold 43g, the extraction device 41 sets the threshold 43g to a value "1" obtained by subtracting the counter maximum value "2" from the value "3" of the threshold 43g as illustrated in FIG. 23. Then, as illustrated in FIG. 23, the extraction device 41 stores the values of the point management variables in all of the columns into the point management variable stack 43f. Then, as illustrated in FIG. 23, the extraction device 41 sets the values of the point management variables in all of the columns to "0". Then, as illustrated in FIG. 23, the extraction device 41 moves the position of the column to be processed to the first column. The extraction device 41 subsequently sets the selected episode 48 to be the definite portion. At this time, the extraction device 41 selects the event to be added first, that is, the event A, as a candidate event because the episode is set to be the definite portion. Here, the value "0" of the counter 13c is less than the value "1" of the threshold 43g as illustrated in FIG. 23, and the extraction device 41 performs the following process. That is, as illustrated in FIG. 24, the extraction device 41 generates an episode 49 by adding the event A that is the selected candidate event to the selected second part of the selected episode 48.

Figure 25:
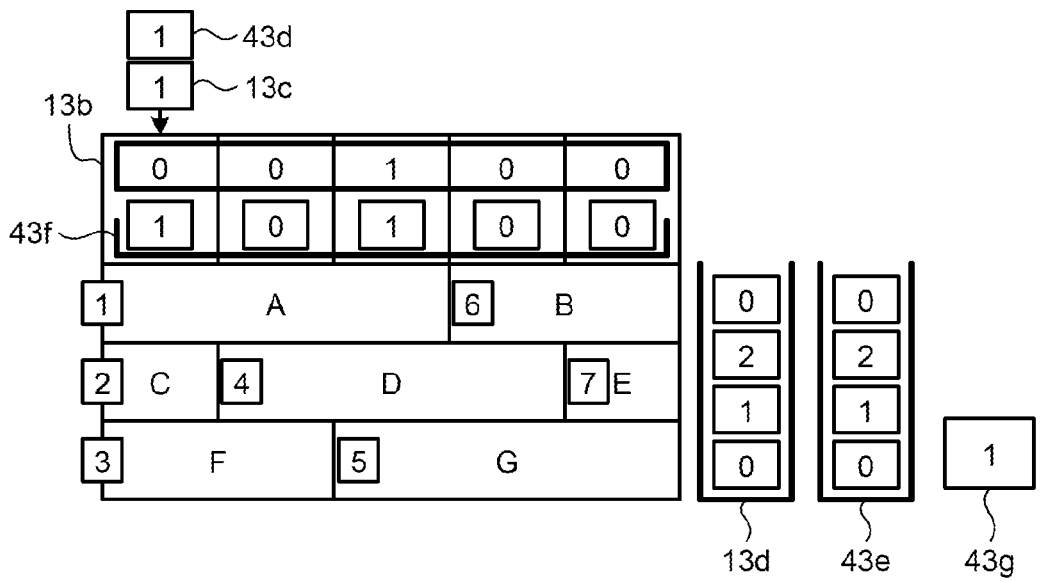
FIG. 25 is a diagram for explaining an example of a process executed by the extraction device according to the second embodiment.

Then, as illustrated in FIG. 25, the extraction device 41 stores the value "0" of the counter 13c into the stack 13d. The extraction device 41 subsequently increments the value "0" of the counter 13c by one to update the value of the counter 13c to "1" as illustrated in FIG. 25. The extraction device 41 stores the value "0" of the maximum value counter 43d into the maximum value stack 43e as illustrated in FIG. 25. The extraction device 41 then increments the value "0" of the maximum value counter 43d by one to update the value of the maximum value counter 43d to "1" as illustrated in FIG. 25. Then, the extraction device 41 increments by one the value of the point management variable in the third column that is the rightmost column of the identifier A of the selected candidate event. Thus, as illustrated in FIG. 25, the extraction device 41 sets the value of the point management variable to "1" in the interval table 13b. Here, the episode 49 occurs frequently, and the extraction device 41 extracts the episode 49 and displays the episode 49 on the display unit 12.

Then, the extraction device 41 selects the event C serving as the event to be added second. However, the extraction device 41 does not add the event C to the episode 49 because, as illustrated in FIG. 25, the value "1" of the counter 13c is the same as the value "1" of the threshold 43g. In other words, the extraction device 41 does not generate a new episode by adding the event C to the episode 49. Thereafter, the extraction device 41 selects in order the events F, D, and G as candidate events. However, for the same reason, the extraction device 41 does not add the selected events F, D, and G to the episode 49 to generate new episodes.

Figure 26:
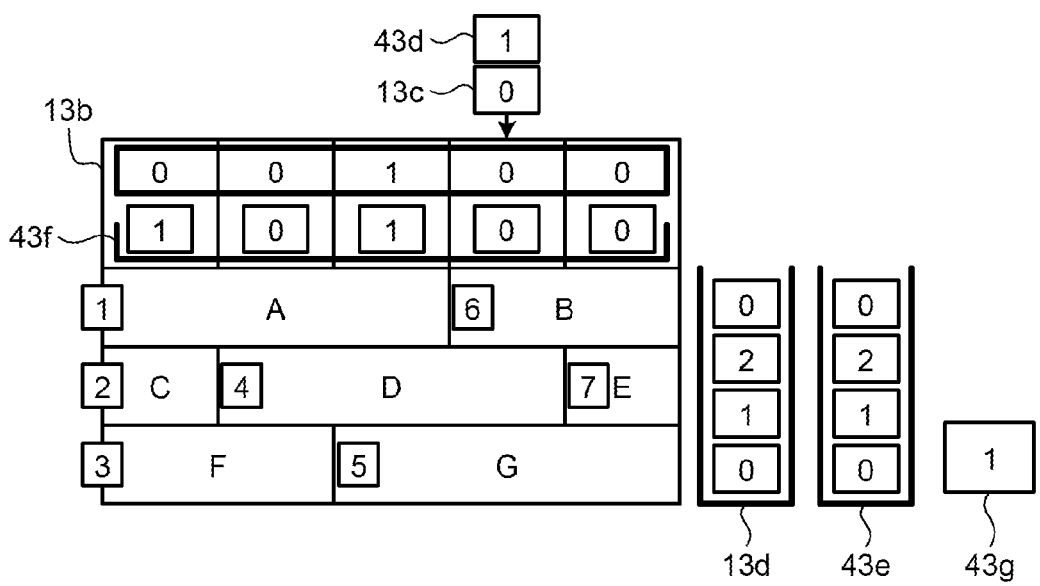
FIG. 26 is a diagram for explaining an example of a process executed by the extraction device according to the second embodiment.

A description will now be made of a case in which the extraction device 41 selects the event B serving as the event to be added sixth as a candidate event. In this case, the value of the counter 13c is "1", and the value of the maximum value counter 43d is "1". The column to be processed is the third column. Consequently, the extraction device 41 determines that the column to be processed (third column) is not the leftmost column (fourth column) of the row in which the identifier B of the selected candidate event is registered. This causes the extraction device 41 to update the value of the counter 13c by setting the counter 13c to a value obtained by subtracting the value "1" of the point management variable in the column to be processed (third column) from the value "1" of the counter 13c. Then, the extraction device 41 moves the column to be processed to the column on the immediate right (fourth column) as illustrated in FIG. 26.

Figure 27:
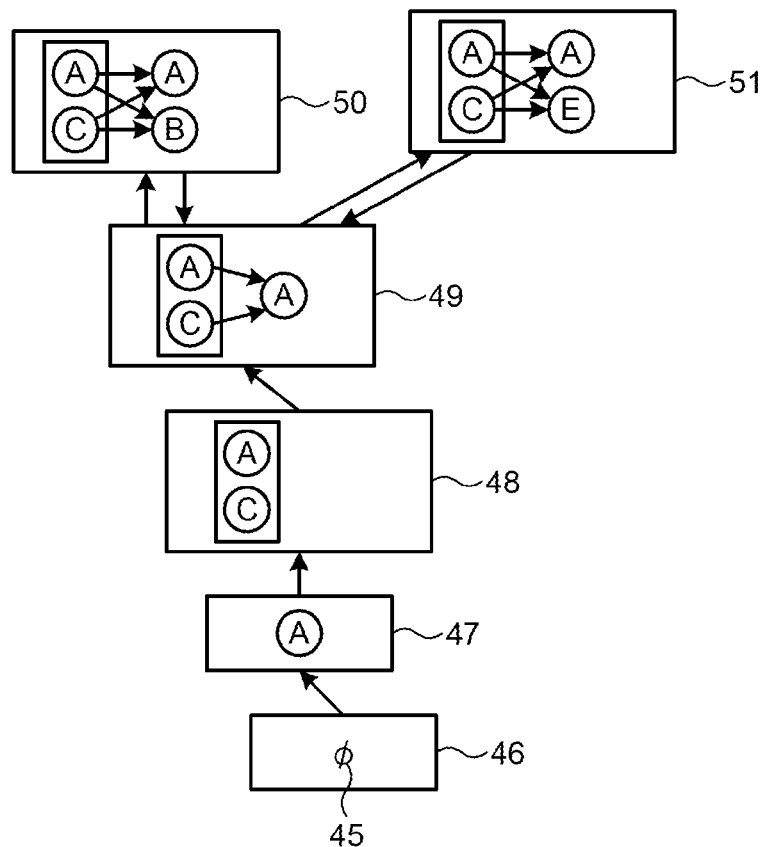
FIG. 27 is a diagram for explaining an example of a process executed by the extraction device according to the second embodiment.
Figure 28:
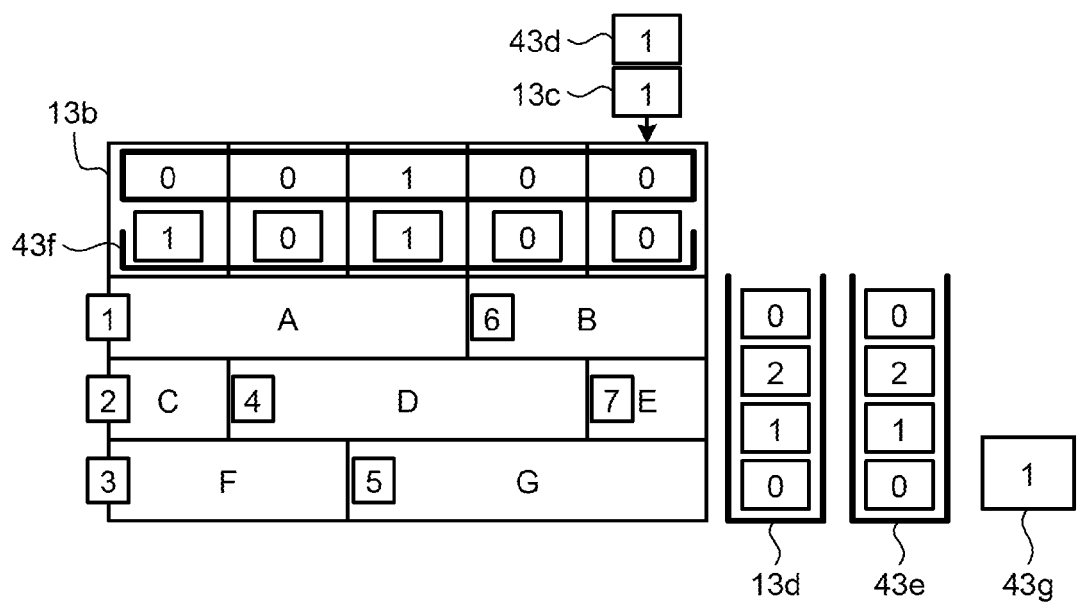
FIG. 28 is a diagram for explaining an example of a process executed by the extraction device according to the second embodiment.

Then, as illustrated in FIG. 27, the extraction device 41 generates an episode 50 by adding the event B to a second part of the episode 49. The episode 50 does not occur frequently, and as illustrated in FIG. 27, the extraction device 41 performs backtracking by deleting the event B of the episode 50 and adds the event E to the second part of the episode 49 to generate an episode 51. The episode 51 does not occur frequently, and as illustrated in FIG. 27, the extraction device 41 performs backtracking by deleting the event E of the episode 51. At this time, the point management variables, the counter 13c, the maximum value counter 43d, the stack 13d, the maximum value stack 43e, the point management variable stack 43f, and the threshold 43g have values illustrated in the example of FIG. 28.

Figure 29:
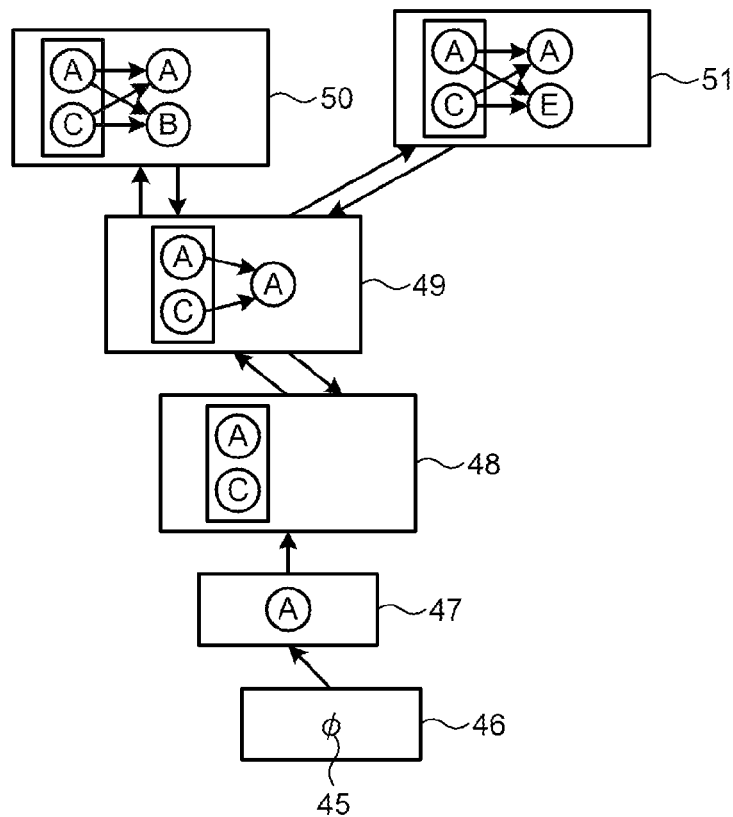
FIG. 29 is a diagram for explaining an example of a process executed by the extraction device according to the second embodiment.
Figure 30:
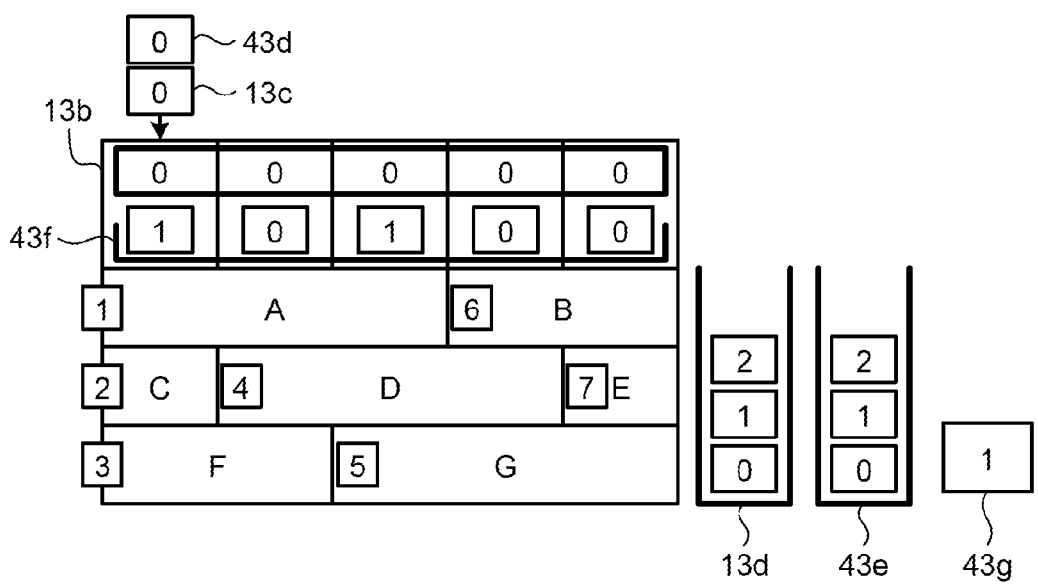
FIG. 30 is a diagram for explaining an example of a process executed by the extraction device according to the second embodiment.

Because no event can be added to the episode 49, the extraction device 41 performs the backtracking by deleting, from the episode 49, the event A included in the second part that is the event last added to the episode 49 as illustrated in FIG. 29. Then, the extraction device 41 acquires the count value "0" last stored in the stack 13d, and sets the counter 13c to the acquired count value "0". The extraction device 41 further acquires the value "0" last stored in the maximum value stack 43e, and sets the maximum value counter 43d to the acquired value "0". Then, the extraction device 41 decrements by one the value "1" of the point management variable in the third column that is the rightmost column of the identifier A of the selected candidate event. Thus, as illustrated in FIG. 30, the extraction device 41 sets the value of the point management variable to "0" in the interval table 13b. In addition, the extraction device 41 moves the column to be processed to the first column as illustrated in FIG. 30.

Figure 31:
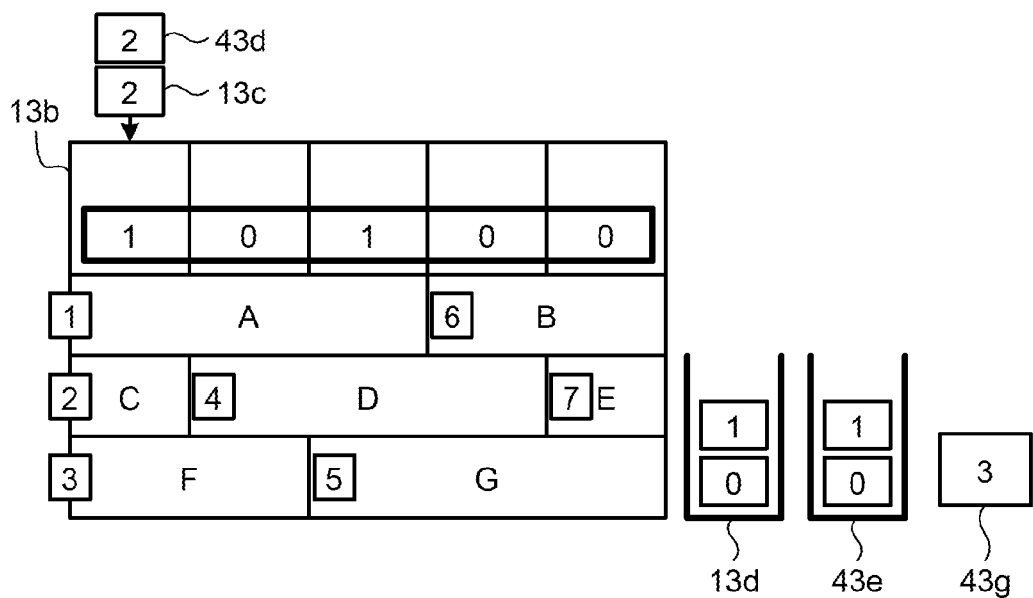
FIG. 31 is a diagram for explaining an example of a process executed by the extraction device according to the second embodiment.

Then, the extraction device 41 acquires the values of the point management variables in all of the columns last stored in the point management variable stack 43f, and as illustrated in FIG. 31, sets the point management variables in all of the columns to the respective values of the acquired point management variables in all of the columns. In addition, the extraction device 41 acquires the count value "2" last stored in the stack 13d, and as illustrated in FIG. 31, sets the counter 13c to the acquired count value "2". The extraction device 41 also acquires the value "2" last stored in the maximum value stack 43e, and as illustrated in FIG. 31, sets the maximum value counter 43d to the acquired value "2". The extraction device 41 sets the threshold 43g to a value "3" obtained by adding the counter maximum value "2" to the value "1" of the threshold 43g, thus updating the value of the threshold 43g as illustrated in FIG. 31. Then, the extraction device 41 performs the subsequent processes.

Procedure of Processes

Figure 32:
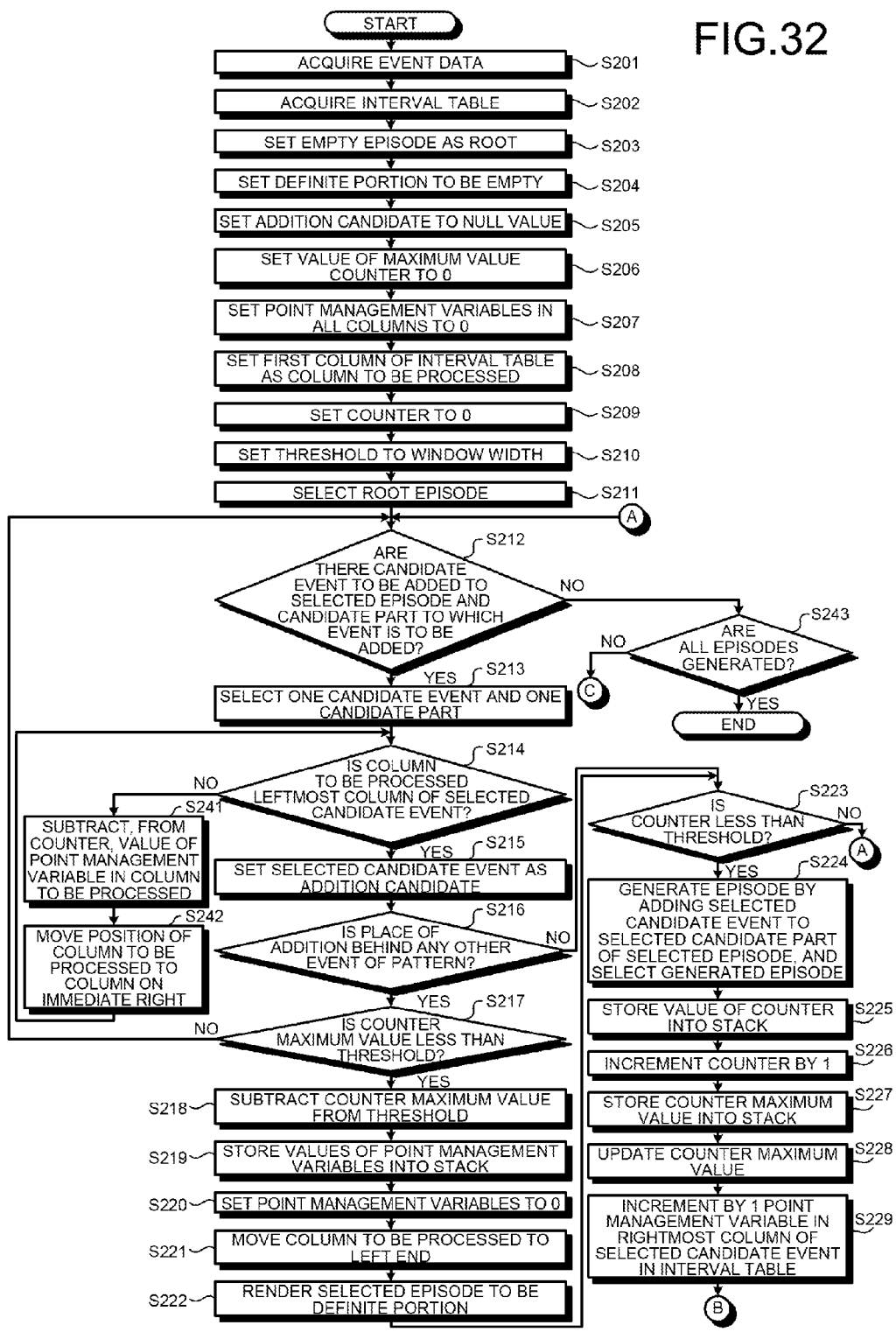
FIG. 32 is a flowchart illustrating the procedure of an extraction process according to the second embodiment.
Figure 33:
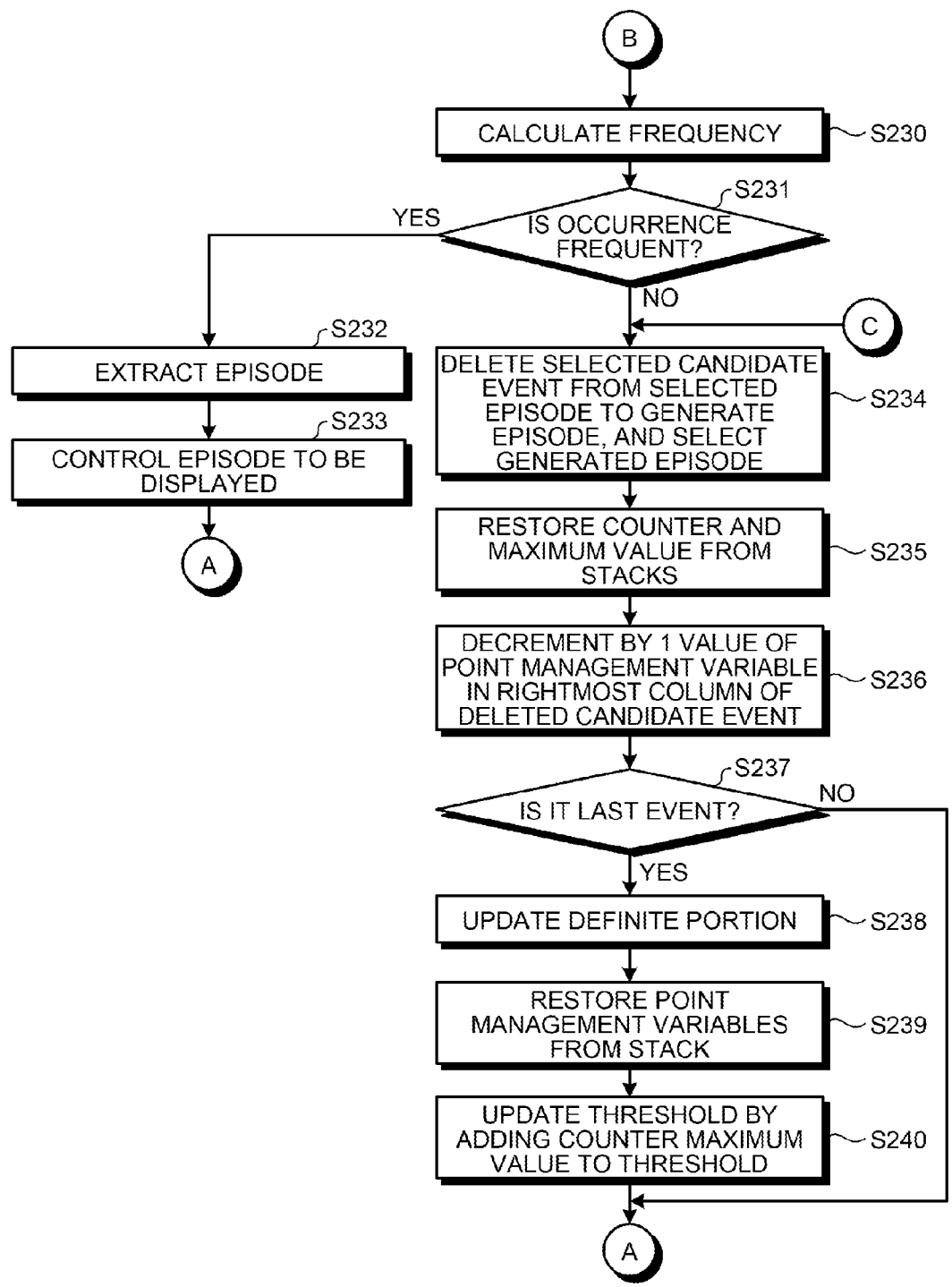
FIG. 33 is a flowchart illustrating the procedure of the extraction process according to the second embodiment.

A description will next be made of the procedure of the processes of the extraction device 41 according to the present embodiment. FIGS. 32 and 33 are flowcharts illustrating the procedure of the extraction process according to the second embodiment. Various types of timing can be considered as execution timing of the extraction process. For example, the control unit 44 executes the extraction process when an instruction to execute the extraction process is entered from the input unit 11.

As illustrated in FIG. 32, the acquisition unit 14a acquires the event data 13a from the storage unit 13 (S201). Next, the acquisition unit 14a acquires the interval table 13b from the storage unit 13 (S202).

Then, the initialization unit 44b sets an empty episode as the first parent, that is, the root in the enumeration tree (S203). The initialization unit 44b sets the definite portion to be empty (S204).

Next, when an event is added to the episode to generate a new episode, the initialization unit 44b sets a null value for an addition candidate that is a candidate event to be added, thus initializing the addition candidate (S205). Next, the initialization unit 44b sets the value of the maximum value counter 43d to "0", thus initializing the value of the maximum value counter 43d (S206).

Then, the initialization unit 44b sets the values of the point management variables in all of the columns of the interval table 13b to "0", thus initializing the point management variables (S207).

Next, the initialization unit 44b sets the first column as a column to be processed (S208). The initialization unit 44b then initializes the counter 13c by setting the value of the counter 13c to "0" (S209). The initialization unit 44b subsequently sets the value of the threshold 43g to the value of the window width (S210).

The generation unit 44c selects the root episode 46 (S211). Then, the generation unit 44c determines whether there are a candidate event to be added to the selected episode and a candidate part to which the event is to be added (S212).

If there are a candidate event to be added to the selected episode and a part to which the event is to be added (Yes at S212), the generation unit 44c selects one candidate event and one candidate part (S213). Next, the generation unit 44c determines whether, in the interval table 13b, the column to be processed is the leftmost column of a row in which the identifier of the selected candidate event e is registered (S214).

If the column to be processed is the leftmost column of the row in which the identifier of the selected candidate event e is registered (Yes at S214), the generation unit 44c sets the selected candidate event as the addition candidate (S215).

Next, the generation unit 44c determines whether the place of addition of the selected candidate event e is behind the other events included in the selected episode (S216). If the place of addition of the selected candidate event e is behind the other events included in the selected episode (Yes at S216), the generation unit 44c determines whether the value of the maximum value counter 43d (counter maximum value) is less than the value "3" of the threshold 43g (S217). If the counter maximum value is not less than the value "3" of the threshold 43g (No at S217), the process returns to S212.

If, instead, the counter maximum value is less than the value "3" of the threshold 43g (Yes at S217), the generation unit 44c updates the value of the threshold 43g by subtracting the counter maximum value from the value "3" of the threshold 43g (S218).

Next, the generation unit 44c stores the values of the point management variables in all of the columns into the point management variable stack 43f (S219). The generation unit 44c then sets the values of the point management variables in all of the columns to "0" (S220). The generation unit 44c subsequently moves the position of the column to be processed to the column on the immediate right (S221). Thereafter, the generation unit 44c renders the selected episode to be a definite portion by setting the episode to be the definite portion (S222).

Then, the generation unit 44c determines whether, in the interval table 13b, the value of the counter 13c is less than the value "3" of the threshold 43g (S223). If the value of the counter 13c is not less than the value "3" of the threshold 43g (No at S223), the process returns to S212.

If, instead, the value of the counter 13c is less than the value "3" of the threshold 43g (Yes at S223), the generation unit 44c generates an episode by adding the selected candidate event to the selected candidate part of the selected episode, and selects the generated episode (S224).

The counter control unit 44e stores the value of the counter 13c into the stack 13d (S225). The counter control unit 44e then increments the value of the counter 13c by one (S226).

Next, the counter control unit 44e stores the counter maximum value into the maximum value stack 43e (S227). The counter control unit 44e then increments the value of the maximum value counter 43d by one (S228).

Next, the counter control unit 44e increments by one the value of the point management variable in the rightmost column of the row in which the identifier of the selected candidate event is registered in the interval table 13b (S229).

The extraction unit 44f calculates the frequency of the generated pattern (S230). Then, the extraction unit 44f determines whether the episode occurs frequently by determining whether the calculated frequency is "1" (S231). If the episode occurs frequently (Yes at S231), the extraction unit 44f extracts, as an episode to be displayed, the episode that is determined to occur frequently (S232).

The display control unit 14g controls the display of the display unit 12 so as to display the episode extracted by the extraction unit 44f (S233), and the process returns to S212.

If, instead, the episode does not occur frequently (No at S231), the backtrack processing unit 44d deletes the last added event from the generated episode to generate an episode, and selects the generated episode (S234). Next, the counter control unit 44e acquires the count value last stored in the stack 13d, and sets the counter 13c to the acquired count value to restore the value of the counter 13c from the stack 13d. In addition, the counter control unit 44e acquires the counter maximum value last stored in the maximum value stack 43e, and sets the maximum value counter 43d to the acquired counter maximum value to restore the value of the maximum value counter 43d from the maximum value stack 43e (S235). Thereafter, the counter control unit 44e decrements by one the value of the point management variable in the column corresponding to the right end of the row in which the identifier of the deleted event is registered in the interval table 13b (S236).

Then, the counter control unit 44e determines whether the deleted event is the last event of the episode before the deletion (S237). If the deleted event is not the last event (No at S237), the process returns to S212. If the deleted event is the last event (Yes at S237), the counter control unit 44e updates the definite portion using, as a new definite portion, the definite portion to which the selected episode is set (S238).

Then, the counter control unit 44e acquires the values of the point management variables in all of the columns last stored in the point management variable stack 43f, and sets the point management variables to the respective values of the acquired point management variables in all of the columns (S239). The counter control unit 44e then updates the value of the threshold 43g by adding the counter maximum value to the value of the threshold 43g (S240), and the process returns to S212.

If the column to be processed is not the leftmost column of the row in which the identifier of the selected candidate event e is registered (No at S214), the counter control unit 44e performs the following process. That is, the counter control unit 44e updates the value of the counter 13c by subtracting the value of the point management variable in the column to be processed from the value of the counter 13c (S241). Then, the counter control unit 44e moves the position of the column to be processed to the column on the immediate right (S242), and the process returns to S214.

If there is no candidate event to be added or no candidate part to which the event is to be added (No at S212), the generation unit 44c determines whether all the episodes are generated except episodes that are no longer generated because of the pruning (S243). If all the episodes are generated except episodes that are no longer generated because of the pruning (Yes at S243), the process is terminated. If, instead, it is not determined that all the episodes are generated except episodes that are no longer generated because of the pruning (No at S243), the process proceeds to S234.

As described above, when the episode is set to be the definite portion, the extraction device 41 subtracts, from the value of the threshold 43g, the value corresponding to the number of times at which the mutually exclusive events included in the definite portion occur in the pattern of events represented by the event data 13a. This allows the extraction device 41 to suppress generation of episodes that are not extracted.

Third Embodiment

Configuration of Extraction Device

Figure 34:
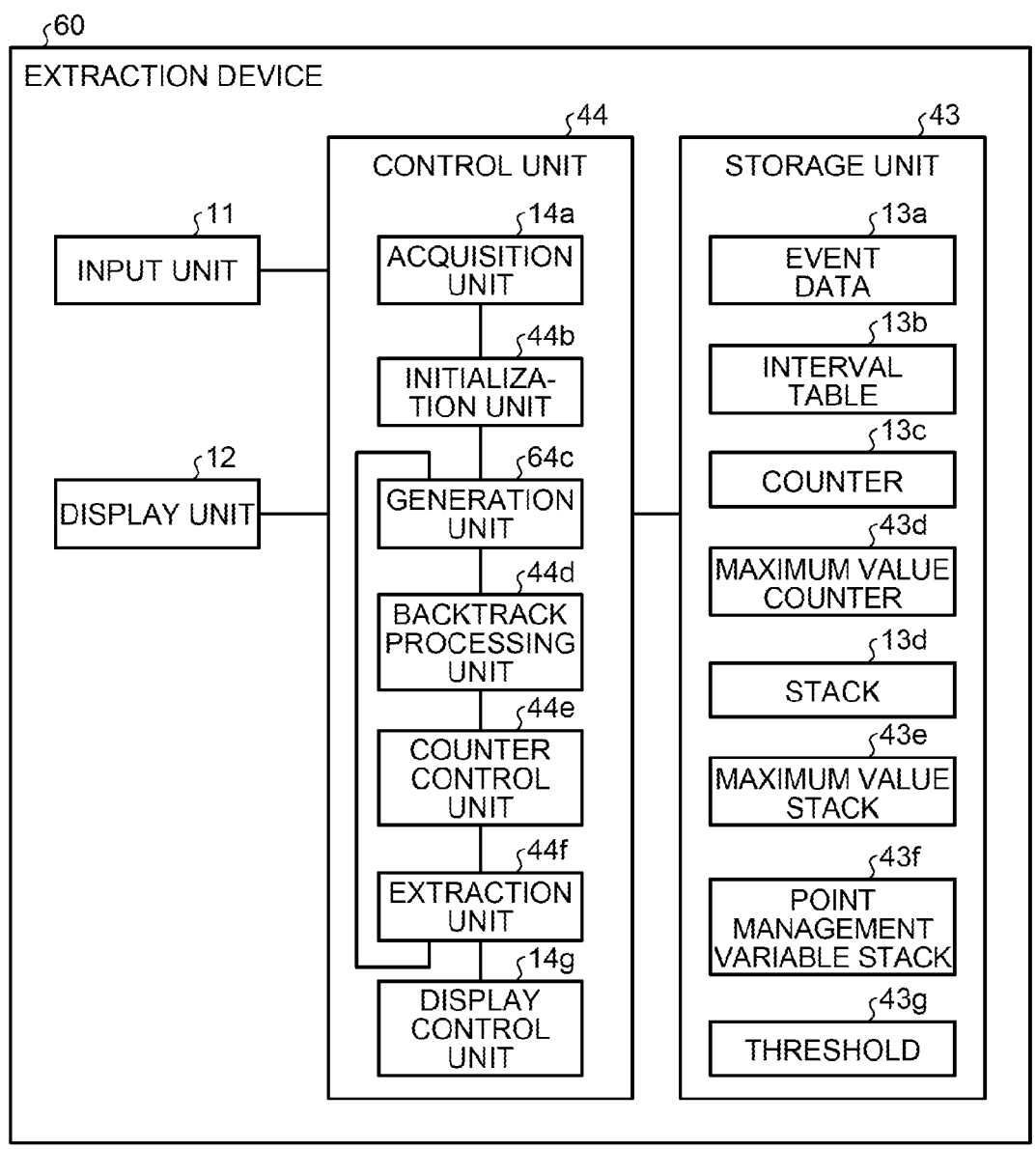
FIG. 34 is a diagram illustrating an example of a functional configuration of an extraction device according to a third embodiment of the present invention.

A description will next be made of an extraction device according to a third embodiment of the present invention. As illustrated in FIG. 34, an extraction device 60 includes a control unit 44. The control unit 44 according to the third embodiment differs from the control unit 44 according to the second embodiment illustrated in FIG. 16 in that the control unit 44 according to the third embodiment includes a generation unit 64c instead of the generation unit 44c. Note that, hereinafter, the same numerals as those in FIG. 1 or 16 will be given to units and devices performing the same functions as those of the first or the second embodiment above, and descriptions thereof may be omitted.

When the generation unit 64c according to the third embodiment selects an event as a candidate event to be added to a selected episode, the generation unit 64c can select any event if the event is to be added behind a definite portion. This prevents the order of events to be added to the episode from being restricted to the order of addition indicated by the interval table 13b, and thus allows any events to be added to generate episodes.

Procedure of Processes

Figure 35:
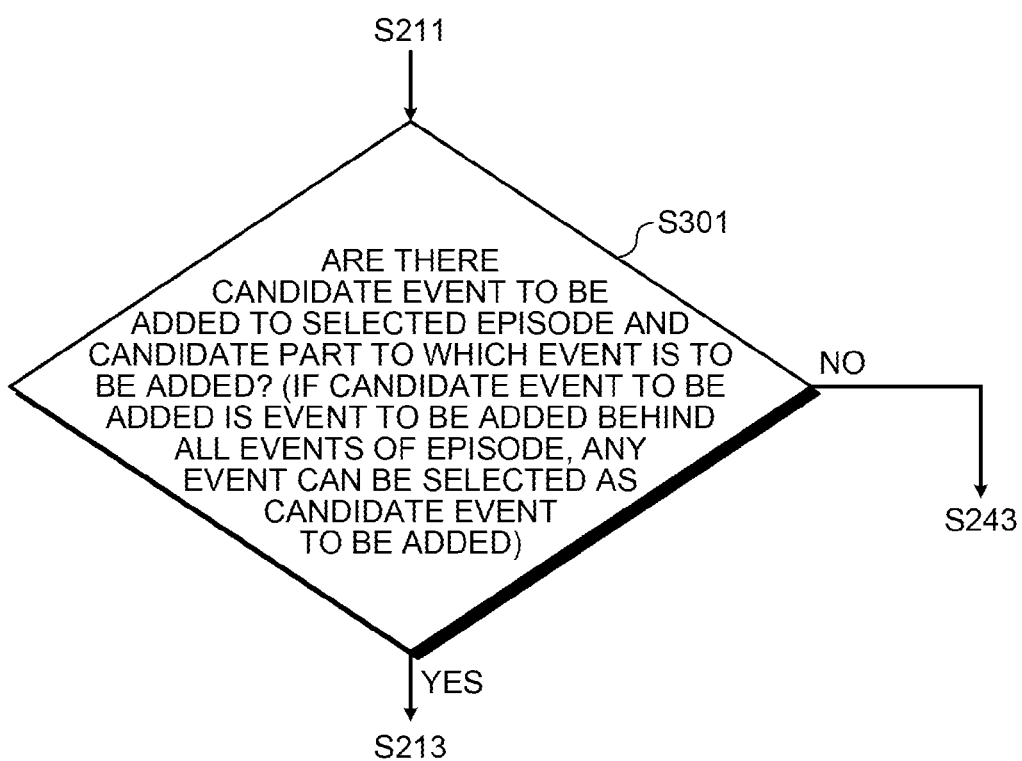
FIG. 35 is a flowchart illustrating a part of the procedure of an extraction process according to the third embodiment.

A description will next be made of the procedure of processes of the extraction device 60 according to the present embodiment. FIG. 35 is a flowchart illustrating a part of the procedure of the extraction process according to the third embodiment. Various types of timing can be considered as execution timing of the extraction process. For example, the control unit 44 according to the third embodiment executes the extraction process when an instruction to execute the extraction process is entered from the input unit 11.

The flowchart illustrating the procedure of the extraction process according to the third embodiment differs from the flowchart illustrating the procedure of the extraction process according to the second embodiment in that S301, instead of S212, is executed.

As illustrated in FIG. 35, the generation unit 64c determines, after S211, whether there are a candidate event to be added to the selected episode and a candidate part to which the event is to be added (S301). In the present embodiment, if the episode is set to be the definite portion, the event is added behind or in front of the definite portion. Here, the following description gives an example in which the event is added behind the definite portion if the episode is set to be the definite portion. If the episode is set to be the definite portion, the generation unit 64c initializes the order of addition of events, and selects the event to be added first as the candidate event. Thereafter, if the event is to be added behind the definite portion, the generation unit 64c selects any event as the candidate event.

If there are a candidate event to be added to the selected episode and a candidate part to which the event is to be added (Yes at S301), the process proceeds to S213. If, instead, there is no candidate event to be added to the selected episode or no candidate part to which the event is to be added (No at S301), the process proceeds to S243.

The extraction device 60 according to the third embodiment can add any events to generate episodes with the order of events to be added to the episode not restricted to the order of addition indicated by the interval table 13b.

Although description has been made of the embodiments related to the device disclosed herein, the present invention can be implemented in various different forms other than those of the embodiments described above. A description will now be made below of other embodiments included in the present invention.

For example, a case has been described in which the device disclosed herein adds an event behind the definite portion. However, the device disclosed herein is not limited to this. The device disclosed herein can perform the same processing by adding the event in front of the definite portion.

Among the processes described in the embodiments, all or some of the processes described as being performed automatically can be performed manually.

The processes at the steps of the processes described in the embodiments can be optionally subdivided or integrated according to various conditions of load and/or use. Some steps can also be omitted.

The orders of processes at the steps of the processes described in the embodiments can be changed according to various conditions of load and/or use.

The constituent elements of the illustrated devices are functionally conceptual, and need not be physically configured as illustrated. In other words, the specific state of dispersion and integration of each of the devices is not limited to be as illustrated, but can be entirely or partially configured to be functionally or physically dispersed or integrated in any units according to various conditions of load and/or use.

Extraction Program

The extraction process of each of the above-described extraction devices (10, 41, and 60) can also be achieved by executing a prepared program on a computer system such as a personal computer or a workstation. A description will now be made below, using FIG. 36, of an example of a computer that executes an extraction program including the same functions as those of the extraction devices described above.

Figure 36:
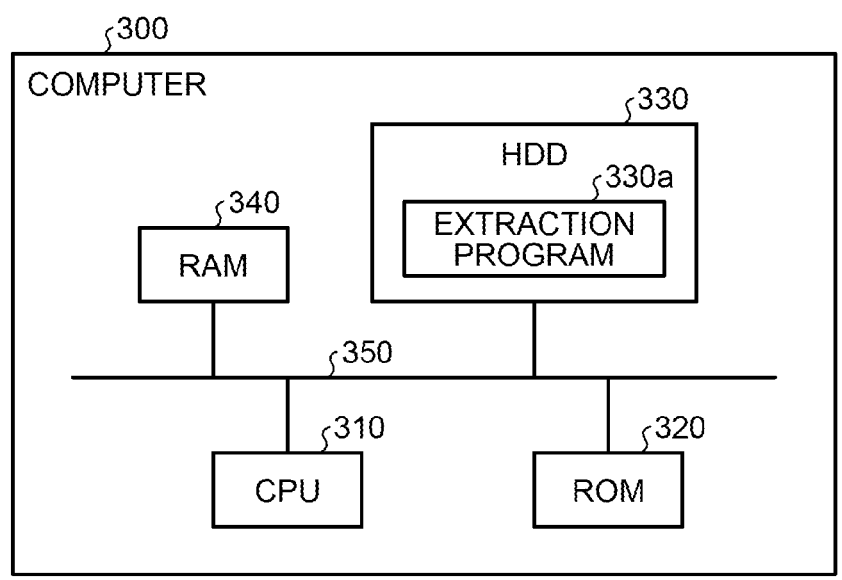
FIG. 36 is a diagram illustrating a computer that executes an extraction program.

FIG. 36 is a diagram illustrating the computer that executes the extraction program. As illustrated in FIG. 36, this computer 300 includes a central processing unit (CPU) 310, a read-only memory (ROM) 320, a hard disk drive (HDD) 330, and a random access memory (RAM) 340. These units 300 to 340 are connected via a bus 350.

The HDD 330 stores therein in advance an extraction program 330a that implements the same functions as those of the units 14a to 14g described in the first embodiment, of the units 14a, 44b to 44f, and 14g described in the second embodiment, or of the units 14a, 44b, 64c, 44d to 44f, and 14g described in the third embodiment. The extraction program 330a may be fragmented as appropriate.

The CPU 310 reads the extraction program 330a from the HDD 330 and executes the program.

The event data, the interval table, and the like are provided in the HDD 330.

The CPU 310 reads the event data and the interval table, and stores them into the RAM 340. The CPU 310 executes the extraction program 330a using the event data and the interval table stored in the RAM 340. The RAM 340 need not always store therein all the data, but needs to store therein only pieces of data used for processing among all pieces of the data.

The extraction program 330a need not be stored in the HDD 330 from the start.

For example, the program may be stored in a "physical medium for portable use" to be inserted into the computer 300, such as a flexible disk (FD), a CD-ROM, a DVD, a magneto-optical disk, or an IC card. The program may be read from such a medium, and executed by the computer 300.

Furthermore, the program may be stored in another computer (or a server) connected to the computer 300 via a public line, the Internet, a LAN, a WAN, and/or the like. The program may be read from such a computer or a server, and executed by the computer 300.

According to an aspect of an extraction program, an extraction device, and an extraction method, patterns can be efficiently extracted.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an extraction program that causes a computer to execute a process comprising:

with reference to a table that is stored in a storage unit and that includes events of which mutually exclusive events are arranged in the same column, adjacent events of the same type are joined together, and the events are given sequences in the order of occurrence thereof, adding an event to a first pattern including the events according to the sequential order, thus generating a second pattern in such a manner that the second pattern is generated by adding the event when a first value is less than a predetermined threshold;

when the event is added, adding a predetermined value to the first value, and adding the predetermined value to a second value in a column corresponding to an end of the added event among second values corresponding to respective columns of the table;

extracting the second pattern that satisfies a predetermined condition; and when an event in a second or subsequent column in the table is added, subtracting the second value in a column immediately before the end of the added event from the first value, thus updating the first value that is to be compared with the predetermined threshold.

2. The non-transitory computer-readable recording medium according to claim 1, wherein the generating of the second pattern includes generating the second pattern when the first value is less than a threshold determined based on a predetermined window width; and based on a plurality of events associated with occurrence times of the events included in the predetermined window width based on event data that is stored in the storage unit and includes a plurality of pieces of data that associate the events with the occurrence times, the extracting of the second pattern includes calculating a frequency at which the second pattern occurs in a pattern of the events represented by the event data and extracting the second pattern in which the frequency satisfies a condition.

3. The non-transitory computer-readable recording medium according to claim 1, the extraction program causing the computer to further execute a process comprising:

when the event added to the first pattern to generate the second pattern is an event added at start or end of the events of the first pattern, updating the threshold by using a value obtained by subtracting, from the threshold, a value corresponding to the number of times at which the mutually exclusive events included in the first pattern occur in the pattern of the events represented by the event data, wherein when the first value and the threshold have been updated, and the updated first value is less than the updated threshold, the generating of the second pattern includes generating the second pattern by adding an event having the first sequential order.

4. The non-transitory computer-readable recording medium according to claim 3, the extraction program causing the computer to further execute a process comprising:

generating the first pattern by deleting an event last added to the second pattern from the second pattern that does not satisfy the predetermined condition;

when the first pattern is generated, using a value obtained by adding the value corresponding to the number of times to the updated first value to newly update the first value; and when the deleted event is at the start or the end of the events when the first pattern is generated, using a value obtained by adding the value corresponding to the number of times to the updated threshold to newly update the threshold; wherein when the first value and the threshold have been newly updated, and the newly updated first value is less than the newly updated threshold, the generating of the second pattern includes generating the second pattern by adding the event having the first sequential order.

5. The non-transitory computer-readable recording medium according to claim 3, the extraction program causing the computer to further execute a process comprising adding an optional event to the newly generated second pattern.

6. An extraction device, comprising:

a memory that stores therein a table that includes events of which mutually exclusive events are arranged in the same column, adjacent events of the same type are joined together, and the events are given sequences in the order of occurrence thereof; and a processor coupled to the memory, wherein the processor executes a process comprising:

adding, based on the table stored in the memory, an event to a first pattern including the events according to the sequential order, thus generating a second pattern in such a manner that the second pattern is generated by adding the event when a first value is less than a predetermined threshold;

adding, when the event is added, a predetermined value to the first value, and adding the predetermined value to a second value in a column corresponding to an end of the added event among second values corresponding to respective columns of the table, and subtracting, when an event in a second or subsequent column in the table is added, the second value in a column immediately before the end of the added event from the first value, thus updating the first value that is to be compared with the predetermined threshold; and extracting the second pattern that satisfies a predetermined condition.

7. An extraction method implemented by a computer, the extraction method comprising:

with reference to a table that is stored in a storage unit and that includes events of which mutually exclusive events are arranged in the same column, adjacent events of the same type are joined together, and the events are given sequences in the order of occurrence thereof, adding an event to a first pattern including the events according to the sequential order, thus generating a second pattern in such a manner that the second pattern is generated by adding the event when a first value is less than a predetermined threshold, using a processor;

when the event is added, adding a predetermined value to the first value, and adding the predetermined value to a second value in a column corresponding to an end of the added event among second values corresponding to respective columns of the table, using the processor;

extracting the second pattern that satisfies a predetermined condition, using the processor; and when an event in a second or subsequent column in the table is added, subtracting the second value in a column immediately before the end of the added event from the first value, thus updating the first value that is to be compared with the predetermined threshold, using the processor.

* * * * *